United States Patent
Martin et al.

(10) Patent No.: US 11,538,259 B2
(45) Date of Patent: Dec. 27, 2022

(54) TOWARD REAL-TIME ESTIMATION OF DRIVER SITUATION AWARENESS: AN EYE TRACKING APPROACH BASED ON MOVING OBJECTS OF INTEREST

(71) Applicant: Honda Motor Co., Ltd., Tokyo (JP)

(72) Inventors: Sujitha Catherine Martin, San Jose, CA (US); Teruhisa Misu, San Jose, CA (US); Hyungil Kim, Rochester Hills, MI (US); Ashish Tawari, Santa Clara, CA (US); Joseph L. Gabbard, Blacksburg, VA (US)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 16/950,820

(22) Filed: Nov. 17, 2020

(65) Prior Publication Data

US 2021/0248399 A1    Aug. 12, 2021

Related U.S. Application Data

(60) Provisional application No. 62/970,989, filed on Feb. 6, 2020.

(51) Int. Cl.
*G06V 20/59*    (2022.01)
*G06F 3/01*    (2006.01)
(Continued)

(52) U.S. Cl.
CPC ........... *G06V 20/597* (2022.01); *B60W 40/08* (2013.01); *B60W 60/001* (2020.02); *G06F 3/013* (2013.01); *G06V 20/58* (2022.01); *B60W 50/14* (2013.01); *B60W 2050/146* (2013.01); *B60W 2420/42* (2013.01); *B60W 2420/52* (2013.01);
(Continued)

(58) Field of Classification Search
CPC ....... B60W 2050/146; B60W 2420/42; B60W 2420/52; B60W 2420/54; B60W 2540/225; B60W 2540/229; B60W 40/08; B60W 50/14; B60W 60/001; G06F 3/013; G06K 9/00805; G06K 9/00845
See application file for complete search history.

(56) References Cited

U.S. PATENT DOCUMENTS 7,096,004 B2    8/2006    Minear et al.
8,837,718 B2    9/2014    Lauter et al.
(Continued)

OTHER PUBLICATIONS

Final Office Action received for U.S. Appl. No. 16/846,081, dated Aug. 17, 2022, 17 pages.
(Continued)

*Primary Examiner* — Farzana Hossain
(74) *Attorney, Agent, or Firm* — Kubota & Basol LLP

(57) ABSTRACT

The present disclosure provides a method and system to operationalize driver eye movement data analysis based on moving objects of interest. Correlation and/or regression analyses between indirect (e.g., eye-tracking) and/or direct measures of driver awareness may identify variables that feature spatial and/or temporal aspects of driver eye glance behavior relative to objects of interest. The proposed systems and methods may be further combined with computer-vision techniques such as object recognition to (e.g., fully) automate eye movement data processing as well as machine learning approaches to improve the accuracy of driver awareness estimation.

25 Claims, 8 Drawing Sheets

(51) Int. Cl.
  *B60W 60/00* (2020.01)
  *B60W 40/08* (2012.01)
  *G06V 20/58* (2022.01)
  *B60W 50/14* (2020.01)

(52) U.S. Cl.
  CPC ... *B60W 2420/54* (2013.01); *B60W 2540/225* (2020.02); *B60W 2540/229* (2020.02)

(56) References Cited

U.S. PATENT DOCUMENTS

| | | | |
|---|---|---|---|
| 10,021,103 | B2 | 7/2018 | Xu et al. |
| 2010/0033333 | A1* | 2/2010 | Victor .................. G06V 20/597 340/576 |
| 2014/0359305 | A1 | 12/2014 | Pappachan et al. |
| 2015/0195086 | A1 | 7/2015 | Davison |
| 2015/0222606 | A1 | 8/2015 | Yan |
| 2016/0359916 | A1 | 12/2016 | Kim et al. |
| 2018/0024562 | A1 | 1/2018 | Bellaiche |
| 2018/0053103 | A1* | 2/2018 | Delgado ............. G06V 20/597 |
| 2019/0283746 | A1 | 9/2019 | Shalev-shwartz et al. |
| 2020/0057487 | A1* | 2/2020 | Sicconi ................. G06T 7/174 |
| 2020/0082117 | A1 | 3/2020 | Simmons et al. |
| 2020/0139965 | A1* | 5/2020 | Hanna ............... G06K 9/00597 |
| 2020/0207358 | A1* | 7/2020 | Katz ...................... G06F 3/017 |
| 2020/0344237 | A1 | 10/2020 | Murdoch et al. |
| 2020/0374269 | A1 | 11/2020 | Lidman |
| 2021/0232913 | A1 | 7/2021 | Martin et al. |
| 2021/0271866 | A1 | 9/2021 | Hayakawa et al. |
| 2021/0320947 | A1 | 10/2021 | Moridi |
| 2022/0204020 | A1 | 6/2022 | Misu |

OTHER PUBLICATIONS

Non-Final Office Action received for U.S. Appl. No. 16/846,081, dated Mar. 2, 2022, 15 pages.
Notice of Allowance received for U.S. Appl. No. 16/805,607, dated Jan. 27, 2022, 9 pages.
Alahi et al., "Social LSTM: Human Trajectory Prediction in Crowded Spaces", IEEE Conference on Computer Vision and Pattern Recognition (CVPR), Jun. 2016, pp. 961-971.
Alemi et al., "Deep Variational Information Bottleneck", Conference Paper at ICLR 2017, 2017, 19 pages.
Anonymous, "Toward Simulation of Driver Behavior in Level 2 Driving Automation", Conference 17, USA, Jul. 2017, 5 pages.
Antoniou et al., "Data Augmentation Generative Adversarial Networks", Available Online at: <https://arxiv.org/abs/1711.04340>, 2017, 14 pages.
Arakawa Toshiya, "Trial Verification of Human Reliance on Autonomous Vehicles from the Viewpoint of Human Factors", International Journal of Innovative Computing, Information & Control, vol. 14, No. 2, 2017, pp. 491-501.
Barifah Maram, "Automatic Simulation of Users for Interactive Information Retrieval", in Proceedings of the 2017 Conference on Conference Human Information interaction and Retrieval, Association for Computing Machinery, Available Online at: <https://dl.acm.org/doi/pdf/10.1145/3020165.3022168>, 2017, pp. 399-401.
Becker et al., "Bosch's Vision and Roadmap Toward Fully Autonomous Driving", Available Online at: <https://doi.org/10.1007/978-3-319-05990-7_5>, 2014, 11 pages.
Bertoni et al., "MonoLoco: Monocular 3D Pedestrian Localization and Uncertainty Estimation", EPFL VITA lab, CH-1015 Lausanne, Aug. 2019, 11 pages.
Bojarski et al., "End to End Learning for Self-Driving Cars", NVIDIA Corporation Holmdel, NJ 07735, Apr. 25, 2016, 9 pages.
Bojarski et al., "VisualBackProp: Visualizing CNNs for Autonomous Driving", Nov. 16, 2016, 13 pages.
Bolstad et al., "Measurement of Situation Awareness for Automobile Technologies of the Future", Performance Metrics for Assessing Driver Distraction: The Quest for Improved Road Safety, 2010, 18 pages.

Chen et al., "3D Object Proposals for Accurate Object Class Detection", Curran Associates Inc., Advances in Neural Information Processing Systems 28, 2015, pp. 424-432.
Chen et al., "Monocular 3D Object Detection for Autonomous Driving", IEEE Conference on Computer Vision and Pattern Recognition (CVPR), Jun. 2016, pp. 2147-2156.
Chen et al., "Multi-View 3D Object Detection Network for Autonomous Driving", Department of Electronic Engineering, Tsinghua University Baidu Inc., Jun. 22, 2017, 9 pages.
Du et al., "Predicting Takeover Performance in Conditionally Automated Driving", Proc. Conference on Human Factors in Computing Systems (CHI), Available Online at: <https://dl.acm.org/doi/pdf/10.1145/3334480.3382963>, 2020, 8 pages.
Endsley Mica R., "A Systematic Review and Meta-Analysis of Direct Objective Measures of Situation Awareness: A Comparison of SAGAT and SPAM", Human factors, doi: 10.1177/0018720819875376, Available online at: <http://www.ncbi.nlm.nih.gov/pubmed/31560575>, Sep. 2019, pp. 124-150.
Endsley Mica R., "Toward a Theory of Situation Awareness in Dynamic Systems", Hum Factors, vol. 37, No. 1, Available Online at: <https://doi.org/10.1518/001872095779049543>, Mar. 1995, pp. 32-64.
Faria et al., "The Effect of Augmented Reality Cues on Glance Behavior and Driver-initiated Takeover in Conditionally Automated Driving", in AutoUI in Submission, 2020, 15 pages.
Finn et al., "A Connection Between Generative Adversarial Networks, Inverse Reinforcement Learning, and Energy-Based Models", University of California, Berkeley, Nov. 25, 2016, 10 pages.
Finn et al., "Guided Cost Learning: Deep Inverse Optimal Control via Policy Optimization", University of California, Berkeley, Berkeley, CA 94709 USA, May 27, 2016, 13 pages.
Frid-Adar et al., "Gan-based Synthetic Medical Image Augmentation for Increased CNN Performance in Liver Lesion Classification", Available Online at: <https://doi.org/10.1016/j.neucom.2018.09.013>, 2018, 10 pages.
Fu et al., "Learning Robust Rewards with Adversarial Inverse Reinforcement Learning", Conference Paper at ICLR 2018, Department of Electrical Engineering and Computer Science, University of California, 2018, 15 pages.
Gabbard et al., "AR DriveSim: An Immersive Driving Simulator for Augmented Reality Head-Up Display Research", Frontiers for Augmented Reality Head-Up Display Research, Frontiers in Robotics and AI, vol. 6, Available online at: <https://www.frontiersin.org/article/10.3389/frobt.2019.00098/full>, Oct. 23, 2019, 16 pages.
Geiger et al., "Vision Meets Robotics: The KITTI Dataset", International Journal of Robotics Research (IJRR), 2013, 6 pages.
Gilmer et al., "Neural Message Passing for Quantum Chemistry", Jun. 12, 2017, 14 pages.
Godard et al., "Unsupervised Monocular Depth Estimation with Left-Right Consistency", Available Online at: <http://visual.cs.ucl.ac.uk/pubs/monoDepth/>, Sep. 2016, 14 pages.
Gold et al., "Modeling take-over performance in level 3 conditionally automated vehicles", Accident Analysis and Prevention, Available Online at: <http://dx.doi.org/10.1016/j.aap.2017.11.009>, 2017, 11 pages.
Goodfellow et al., "Generative Adversarial Nets", Curran Associates, Inc., Available Online at: <http://papers.nips.cc/paper/5423-generative-adversarial-nets.pdf>, 2014, pp. 2672-2680.
Gregoriades et al., "Simulation-based Evaluation of an in-vehicle Smart Situation Awareness Enhancement System", Ergonomics, vol. 61, No. 7, Available online at: <https://www.tandfonline.com/doi/full/10.1080/00140139.2018.1427803>, 2018, 24 pages.
Güler et al., "DensePose: Dense Human Pose Estimation in the Wild", in Proceedings of the IEEE Conference on Computer Vision and Pattern Recognition, 2018, pp. 7297-7306.
Gupta et al., "Social GAN: Socially Acceptable Trajectories with Generative Adversarial Networks", Mar. 2018, 10 pages.
Hayakawa et al., "Pedestrian Action Recognition and Localization Using RGB Images and Pose", 2020, 6 pages.
He et al., "Mask R-CNN", Facebook AI Research (FAIR), Jan. 2018, 12 pages.
Hergeth, "Keep Your Scanners Peeled: Gaze Behavior as a Measure of Automation Trust During Highly Automated Driving", Hum

(56) References Cited

OTHER PUBLICATIONS

Factors 58, Available Online at: <https://doi.org/10.1177/0018720815625744>, May 2016, pp. 509-519.
Hoshen Yedid, "VAIN: Attentional Multi-agent Predictive Modeling", Facebook AI Research, NYC, Sep. 28, 2018, 12 pages.
Inagaki et al., "Human's Overtrust in and Overreliance on Advanced Driver Assistance Systems: A Theoretical Framework", International Journal of Vehicular Technology, Available Online at: <http://dx.doi.org/10.1155/2013/951762>, 2013, 8 pages.
Itani et al., "Privacy as a Service: Privacy-Aware Data Storage and Processing in Cloud Computing Architectures", Eighth IEEE International Conference on Dependable, Autonomic and Secure Computing, Dec. 2009, pp. 711-716.
Jajodia et al., "A Unified Framework for Enforcing Multiple Access Control Policies", ACM, 1997, 474-485 pages.
Jang et al., "Categorical Reparameterization With Gumbel-Softmax", conference paper at ICLR 2017, Aug. 5, 2017, 13 pages.
Just et al., "A Theory of Reading: From Eye Fixations to Comprehension", Psychological Review, vol. 87, No. 04, Jul. 1980, pp. 329-354.
Kesting et al., "Enhanced Intelligent Driver Model to Access the Impact of Driving Strategies on Traffic Capacity", Institute for Transport & Economics, Dec. 18, 2009, 20 pages.
Kim et al., "Assessing Distraction Potential of Augmented Reality Head-Up Displays for Vehicle Drivers", Human Factors: The Journal of the Human Factors and Ergonomics Society, Available online at: <http://journals.sagepub.com/doi/10.1177/0018720819844845>, May 2019, 14 pages.
Kim et al., "Interpretable Learning for Self-Driving Cars by Visualizing Causal Attention", Computer Science Division University of California, Berkeley, CA 94720, USA, Mar. 30, 2017, 9 pages.
Kim et al., "Textual Explanations for Self-Driving Vehicles", EECS, University of California, Berkeley CA 94720, USA, MPI for Informatics, Saarland Informatics Campus, 66123 Saarbrucken, Germany, AMLab, University of Amsterdam, 1098 XH Amsterdam, Netherlands, Jul. 30, 2018, 24 pages.
Kim et al., "Toward Prediction of Driver Awareness of Automotive Hazards: Driving—Video-Based Simulation Approach", Proceedings of the Human Factors and Ergonomics Society Annual Meeting, vol. 63, No. 1, Available online at: <http://journals.sagepub.com/doi/10.1177/1071181319631003>, Nov. 2019., pp. 2099-2103.
Kim et al., "Toward Real-Time Estimation of Driver Situation Awareness: An Eye Tracking Approach based on Moving Objects of Interest", 2020 IEEE Intelligent Vehicles Symposium (IV), doi: 10.1109/IV47402.2020.9304770, 2020, pp. 1035-1041.
Kim et al., "Virtual Shadow: Making Cross Traffic Dynamics Visible Through Augmented Reality Head up Display", Proceedings of the Human Factors and Ergonomics Society, SAGE Publications, 2016, pp. 2093-2097.
Kim Hyungil, "Augmented Reality Pedestrian Collision Warning: An Ecological Approach to Driver Interface Design and Evaluation", PhD Dissertation, Virginia Tech., Sep. 29, 2017, 144 pages.
Kipf et al., "Neural Relational Inference for Interacting Systems", Jun. 6, 2018, 17 pages.
Koenderink et al., "Spatial and Temporal Parameters of Motion Detection in the Peripheral Visual Field", Journal of the Optical Society of America A, vol. 2, No. 2, Available online at: <https://www.osapublishing.org/abstract.cfm?URI=josaa-2-2-252>, Feb. 1985, pp. 252-259.
Kotseruba et al., "Joint Attention in Autonomous Driving (JAAD)", Apr. 2017, 10 pages.
Kreiss et al., "PifPaf: Composite Fields for Human Pose Estimation", in the IEEE Conference on Computer Vision and Pattern Recognition (CVPR), Jun. 2019, 10 pages.
Kumar et al., "Adaptive Trust Calibration for Level Driving Automation", Proc. IEEE Intelligent Transportation Systems Available Online at <https://doi.org/10.1145/3334480.3382963>, Sep. 24, 2020, 10 pages.
Levine Sergey, "Reinforcement Learning and Control as Probabilistic Inference: Tutorial and Review", UC Berkeley, May 20, 2018, 22 pages.
Li et al., "Actional-Structural Graph Convolutional Networks for Skeleton-based Action Recognition", CVPR, Apr. 2019, 12 pages.
Li et al., "Investigating the Effects of Age and Disengagement in Driving on Driver's Takeover Control Performance in Highly Automated Vehicles", Transportation Planning and Technology, vol. 42, No. 5, Available online at: <https://doi.org/10.1080/03081060.2019.1609221>, 2019, pp. 470-497.
Liu et al., "Adversarial Learning of Task-Oriented Neural Dialog Models", Available Online at: <https://arxiv.org/abs/1805.11762>, 2018, 10 pages.
Liu et al., "CBNet: A Novel Composite Backbone Network Architecture for Object Detection", Wangxuan Institute of Computer Technology, Peking University, Department of Computer Science, Stony Brook University, Sep. 2019, 8 pages.
Liu et al., "High-Level Semantic Feature Detection: A New Perspective for Pedestrian Detection", in IEEE Conference on Computer Vision and Pattern Recognition (CVPR), 2019, pp. 5187-5196.
Liu et al., "SSD: Single Shot MultiBox Detector", Springer International Publishing AG, ECCV 2016, Part I, LNCS 9905, 2016, pp. 21-37.
Loper et al., "SMPL: A Skinned Multi-Person Linear Model", ACM Transactions on Graphics, vol. 34, No. 6, Oct. 2015, pp. 1-16.
Lu et al., "Eye Tracking: A Process-Oriented Method for Inferring Trust in Automation as a Function of Priming and System Reliability", IEEE, Transactions on Human-Machine Systems, Available online at: <https://doi.org/10.1109/THMS.2019.2930980>, Dec. 2019, pp. 560-568.
Magassouba et al., "Understanding Natural Language Instructions for Fetching Daily Objects Using GAN-Based Multimodal Target-Source Classification", Available Online at: <https://arxiv.org/abs/1906.06830>, 2017, 8 pages.
Maltz et al., "Imperfect In-vehicle Collision Avoidance Warning Systems Can Aid Distracted Drivers", Transportation Research Part F: Traffic Psychology and Behaviour Available Online at: <https://doi.org/10.1016/j.trf.2007.01.002>, 2007, pp. 345-357.
Martin et al., "Dynamics of Driver's Gaze: Explorations in Behavior Modeling & Maneuver Prediction", IEEE Transactions on Intelligent Vehicles, vol. 3, No. 2, Feb. 2018, 10 pages.
Mirza et al., "Conditional Generative Adversarial Nets", Available Online at: <https://arxiv.org/abs/1411.1784>, 2014, 7 pages.
Moore et al., "Development of a Novel Measure of Situation Awareness: The Case for Eye Movement Analysis", Proceedings of the Human Factors and Ergonomics Society Annual Meeting, vol. 54, No. 19, Available online at: <http://journals.sagepub.com/doi/10.1177/154193121005401961 >, Sep. 2010, pp. 1650-1654.
Olsen Anneli, "The Tobii I-VT Fixation Filter", Tobii Technology, Mar. 20, 2012, 21 pages.
Pal et al., ""Looking at the Right Stuff"—Guided Semantic-Gaze for Autonomous Driving", The IEEE/CVF Conference on Computer Vision and Pattern Recognition (CVPR), 2020, 10 pages.
Peng et al., "Variational Discriminator Bottleneck: Improving Imitation Learning, Inverse RL and GANs by Constraining Information Flow", University of California, Berkeley, Dec. 29, 2018, 27 pages.
Ramanishka et al., "Toward Driving Scene Understanding: A Dataset for Learning Driver Behavior and Causal Reasoning", in Conference on Computer Vision and Pattern Recognition, 2018, 9 pages.
Rasouli et al., "Pedestrian Action Anticipation Using Contextual Feature Fusion in Stacked RNNs", BMVC, 2019, 13 pages.
Rayner et al., "Eye Movements", Scholarpedia, vol. 2, No. 10, Available online at: <http://www.scholarpedia.org/article/Eye movements>, 2007, 11 pages.
Redmon et al., "YOLOv3: An Incremental Improvement", University of Washington, Apr. 2018, 6 pages.
Rucci et al., "Fixational Eye Movements and Perception", Vision Research, Jan. 2016, pp. 1-4.
Rushton et al., "Behavioral Development and Construct Validity: The Principle of Aggregation", Psychological Bulletin, vol. 94, No. 1, Jul. 1983, pp. 18-38.

(56) References Cited

OTHER PUBLICATIONS

Sae International, "Taxonomy and Definitions for Terms Related to On-Road Motor Vehicle Automated Driving Systems", Available Online at: <https://www.sae.org/news/3544/>, 2014, 35 pages.

Schatzmann et al., "A Survey of Statistical User Simulation Techniques for Reinforcement-Learning of Dialogue Management Strategies", the Knowledge Engineering Review, Available Online at: <https://doi.org/10.1017/S0269888906000944>, Jun. 2006, 33 pages.

Sethumadhavan, Arathi, "Knowing What You Know: The Role of Meta-Situation Awareness in Predicting Situation Awareness", Proceedings of the Human Factors and Ergonomics Society Annual Meeting, vol. 55, No. 1, Available online at: <http://pro.sagepub.com/lookup/doi/10.1177/1071181311551074>, Sep. 2011, pp. 360-364.

Si et al., "An Attention Enhanced Graph Convolutional LSTM Network for Skeleton-Based Action Recognition", Mar. 2019, 10 pages.

Steenkiste, "Relational Neural Expectation Maximization: Unsupervised Discovery of Objects and Their Interactions", Conference Paper at ICLR 2018, Feb. 28, 2018, 15 pages.

Strasburger et al., "Peripheral Vision and Pattern Recognition: A Review", Journal of Vision, vol. 11, No. 5, 2011, pp. 1-82.

Sukhbaatar et al., "Learning Multiagent Communication with Backpropagation", 29th Conference on Neural Information Processing Systems (NIPS 2016), Barcelona, Spain., Oct. 31, 2006, 12 pages.

Sun et al., "Probabilistic Prediction of Interactive Driving Behavior via Hierarchical Inverse Reinforcement Learning", Sep. 9, 2018, 7 pages.

Tang et al., "Disturbance-Observer-Based Tracking Controller for Neural Network Driving Policy Transfer", IEEE Transactions on Intelligent Transportation Systems, Dec. 5, 2019, 12 pages.

Tawari et al., "Learning to Attend to Salient Targets in Driving Videos Using Fully Convolutional RNN", 21st International Conference on Intelligent Transportation Systems (ITSC), 2018, 8 pages.

Tobii Technology, "Tobii Glasses Eye Tracker User Manual", Danderyd, Sweden: Tobii Technology AB, 2012, 70 pages.

TobiiPro, "Tobii Pro Lab User Manual", Available Online at: <https://www.tobiipro.com/siteassets/tobii-pro/user-manuals/Tobii-Pro-Lab-User-Manual/>, Aug. 31, 2015, 148 pages.

Toshev et al., "DeepPose: Human Pose Estimation via Deep Neural Networks.", IEEE Conference on Computer Vision and Pattern Recognition, 2014, pp. 1653-1660.

Van Dijk et al., "On the Impossibility of Cryptography Alone for {Privacy-Preserving} Cloud Computing", 5th USENIX Workshop on Hot Topics in Security (HotSec 10), 2010, 8 pages.

Velickovic et al., "Graph Attention Networks", Conference Paper at ICLR 2018, Feb. 4, 2018, 12 pages.

Vondrick et al., "Efficiently Scaling up Crowdsourced Video Annotation", International Journal of Computer Vision, vol. 101, No. 1, Jan. 2013, 22 pages.

Wang et al., "Temporal Segment Networks: Towards Good Practices for Deep Action Recognition", Aug. 2016, 16 pages.

Wei et al., "Convolutional Pose Machines", CVPR, 2016, 9 pages.

Wickens et al., "Modeling of Situation Awareness Supported by Advanced Flight Deck Displays", Proceedings of the Human Factors and Ergonomics Society Annual Meeting, vol. 51, No. 12, Available online at: <http://journals.sagepub.com/doi/10.1177/154193120705101204>, Oct. 2007, pp. 794-798.

Winter et al., "Situation Awareness Based on Eye Movements in Relation to the Task Environment", Cognition, Technology and Work, 2019, 14 pages.

Wojke et al., "Simple Online and Realtime Tracking With a Deep Association Metric", IEEE International Conference on Image Processing (ICIP), 2017, pp. 3645-3649.

Wu et al., "Drivers' Attitudes and Perceptions towards a Driving Automation System with Augmented Reality Human-Machine Interface", Proc. IEEE Intelligent Vehicles Symposium, Available Online at: <https://doi.org/10.1109/IV47402.2020.9304717>, 2020, 6 pages.

Wu et al., "Take-Over Performance and Safety Analysis Under Different Scenarios and Secondary Tasks in Conditionally Automated Driving", IEEE, 2019, pp. 136924-136933.

Xia Qi, "MeDShare: Trust-Less Medical Data Sharing Among Cloud Service Providers via Blockchain", IEEE, vol. 5, Jul. 24, 2017, 14757-14767 pages.

Yan et al., "Spatial Temporal Graph Convolutional Networks for Skeleton-Based Action Recognition", Department of Information Engineering, the Chinese University of Hong Kong, Jan. 2018, 10 pages.

Yang et al., "3D Human Pose Estimation in the Wild by Adversarial Learning", IEEE/CVF Conference on Computer Vision and Pattern Recognition, 2018, pp. 5255-5264.

Yu et al., "Multi-Agent Adversarial Inverse Reinforcement Learning", Jul. 30, 2019, 13 pages.

Zhang, "CityPersons: A Diverse Dataset for Pedestrian Detection", Feb. 2017, 12 pages.

Zheng et al., "Mars: A Video Benchmark for Large-Scale Person Re-Identification", in Computer Vision—ECCV 2016, Sep. 2016, pp. 868-884.

Zhou et al., "Temporal Relational Reasoning in Videos", Jul. 2018, 16 pages.

Zhu et al., "StarNet: Pedestrian Trajectory Prediction using Deep Neural Network in Star Topology", Jun. 2019, 6 pages.

Zhu et al., "Unpaired Image-to-Image Translation using Cycle-Consistent Adversarial Networks", in IEEE International Conference on Computer Vision (ICCV), 2017, 18 pages.

Ziebart et al., "Maximum Entropy Inverse Reinforcement Learning", School of Computer Science Carnegie Mellon University Pittsburgh, PA 15213, Proceedings of the Twenty-Third AAAI Conference on Artificial Intelligence, 2008, 6 pages.

\* cited by examiner

| Variables | | Correlation Coefficient | | | | | |
|---|---|---|---|---|---|---|---|
| Awareness | Eye | Individual Event Level | | Object Level | | Driver Level | |
| V1 | V2 | ρ | γ | ρ | γ | ρ | γ |
| SA score | Look | 0.33* | 0.33* | 0.69* | 0.64* | 0.29 | 0.31* |
| | $d_{current}$ | -0.29* | -0.29* | -0.52* | -0.58* | -0.17 | -0.29 |
| | $d_{mint}$ | -0.37* | -0.32* | -0.66* | -0.61* | -0.15 | -0.15 |
| | $t_{elapse}$ | -0.17* | -0.17* | -0.27 | -0.29 | -0.31* | -0.31* |
| | $t_{dwell}$ | 0.37* | 0.27* | 0.64* | 0.49* | 0.17 | 0.13 |
| SA confidence | Look | 0.37* | 0.37* | 0.74* | 0.67* | 0.34* | 0.32* |
| | $d_{current}$ | -0.31* | -0.30* | -0.57* | -0.55* | -0.11 | -0.25 |
| | $d_{mint}$ | -0.43* | -0.35* | -0.70* | -0.59* | -0.18 | -0.13 |
| | $t_{elapse}$ | -0.20* | -0.19* | -0.26 | -0.29 | -0.32* | -0.27 |
| | $t_{dwell}$ | 0.44* | 0.35* | -0.69* | 0.56* | 0.15 | -0.14 |

FIG. 3A

| Variables | | Regression Parameters | | | Model Fit | |
|---|---|---|---|---|---|---|
| Awareness (DV) | Eye Glance (IV) | $\beta$ | S.E. | $t$ | $R^2_{adj}$ | $F$ |
| SA Score | Look | 0.493 | 0.115 | 4.281* | 0.391 | 18.320* |
| | $d_{current}$ | 0.522 | 0.748 | 0.698 | | |
| | $d_{min}$ | -3.611 | 1.134 | -3.186* | 0.515 | 8.168* |
| | $t_{elapse}$ | -8.436 | 3.149 | -2.678* | | |
| | $t_{dwell}$ | 1.954 | 2.562 | 0.763 | | |
| SA Confidence | Look | 0.494 | 0.108 | 4.566* | 0.424 | 20.850* |
| | $d_{current}$ | 0.704 | 0.713 | 0.987 | | |
| | $d_{min}$ | -3.380 | 1.081 | -3.128* | 0.526 | 8.491* |
| | $t_{elapse}$ | -7.857 | 3.002 | -2.168* | | |
| | $t_{dwell}$ | 3.680 | 2.442 | 1.506 | | |

402 — Define relevant objective and/or subjective features (direct measures) of driver situational awareness

403 — Define relevant spatial and/or temporal features (indirect measures) of driver eye glance behavior

404 — Perform manual and/or automated data collection and processing steps for the determined relevant features relative to one or more road hazard(s)

405 — Conduct correlation and/or regression analyses between the indirect measures and direct measures of driver awareness

406 — Operationalize driver eye movement by generating one or more predictive models

FIG. 4A

TOWARD REAL-TIME ESTIMATION OF DRIVER SITUATION AWARENESS: AN EYE TRACKING APPROACH BASED ON MOVING OBJECTS OF INTEREST

CROSS-REFERENCE TO RELATED APPLICATIONS

This application claims priority to U.S. Provisional Application Ser. No. 62/970,989 filed Feb. 6, 2020, titled Toward Real-Time Estimation of Driver Situation Awareness: An Eye Tracking Approach based on Moving Objects of Interest, which is hereby incorporated by reference in its entirety for all purposes.

FIELD

This disclosure relates generally to evaluating situation awareness of a person, and more particularly, to doing so based on eye tracking.

BACKGROUND

For effective human-machine cooperation in (at least) partially automated driving, both the human driver and the vehicle may be attentive to each other's current states and/or future intentions. It may be important for advanced driving assistance systems (ADAS) to not only correctly analyze the environment they are operating in, but also correctly analyze the current state and/or intentions of a vehicle's operator/driver. For example, it may be beneficial for advanced driving systems to not only monitor and correctly analyze environmental changes of the vehicle, but also to correctly analyze the driver's awareness of these environmental changes (e.g., approaching pedestrians, road hazards, etc.) before providing appropriate assistance or intervention (e.g., collision warning or emergency braking). However, it may be challenging to objectively assess if the driver is aware of a specific road hazard.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

According to some aspects of the present disclosure, systems and methods for operationalizing driver eye movement based on moving objects of interest are provided. The disclosed predictive features and models may identify spatial and/or temporal aspects of driver eye glance behavior that strongly correlate to the driver's real time situational awareness relative to one or more road objects of interest. The proposed systems and methods may be further combined with computer-vision techniques such as object recognition to fully automate eye movement data processing as well as machine learning approaches to improve the accuracy of driver awareness estimation.

Some examples of the disclosure are directed to a method including detecting, using one or more sensors, one or more first characteristics associated with a gaze of a person with respect to an object during a period of time. In some examples, the method may include detecting, using the one or more sensors, one or more second characteristics associated with the gaze of the person with respect to the object at a first time after the period of time. In some examples, the method may include determining, using a predictive model, a likelihood that the person is aware of the object based on the one or more first characteristics and the one or more second characteristics. In some examples, the method may include selectively performing an operation based on the determined likelihood.

Some examples of the disclosure are directed to an electronic device including one or more processors, and memory storing instructions, which when executed by the one or more processors, cause the electronic device to perform a method. In some examples, the method includes detecting, using one or more sensors, one or more first characteristics associated with a gaze of a person with respect to an object during a period of time. In some examples, the method includes detecting, using the one or more sensors, one or more second characteristics associated with the gaze of the person with respect to the object at a first time after the period of time. In some examples, the method incudes determining, using a predictive model, a likelihood that the person is aware of the object based on the one or more first characteristics and the one or more second characteristics. In some examples, the method includes selectively performing an operation based on the determined likelihood.

Some examples of the disclosure are directed to a non-transitory computer-readable storage medium including instructions, wherein the instructions are configured to be executed by one or more processors of an electronic device. In some examples, the instructions are for detecting, using one or more sensors, one or more first characteristics associated with a gaze of a person with respect to an object during a period of time. In some examples, the instructions are for detecting, using the one or more sensors, one or more second characteristics associated with the gaze of the person with respect to the object at a first time after the period of time. In some examples, the instructions are for determining, using a predictive model, a likelihood that the person is aware of the object based on the one or more first characteristics and the one or more second characteristics. In some examples, the instructions are for selectively performing an operation based on the determined likelihood.

BRIEF DESCRIPTION OF THE DRAWINGS

The novel features believed to be characteristic of the disclosure are set forth in the appended claims. In the descriptions that follow, like parts are marked throughout the specification and drawings with the same numerals, respectively. The drawings are not necessarily drawn to scale and certain may be shown in exaggerated or generalized form in the interest of clarity and conciseness. The disclosure itself, however, as well as a preferred mode of use, further objectives and advantages thereof, will be best understood by reference to the following detailed description of illustrative embodiments when read in conjunction with the accompanying drawings.

FIG. 3A summarizes example determined correlation values between example derived eye glance measures and example driver's awareness at the individual event, object, and driver level according to some examples of the disclosure.

FIG. 3C summarizes example performance for the fitted linear regression models at the object level according to some examples of the disclosure.

FIG. 4A illustrates an example flow diagram for an example process for generating and operationalizing one or more predictive models according to some examples of the disclosure.

DETAILED DESCRIPTION

Figure 1:
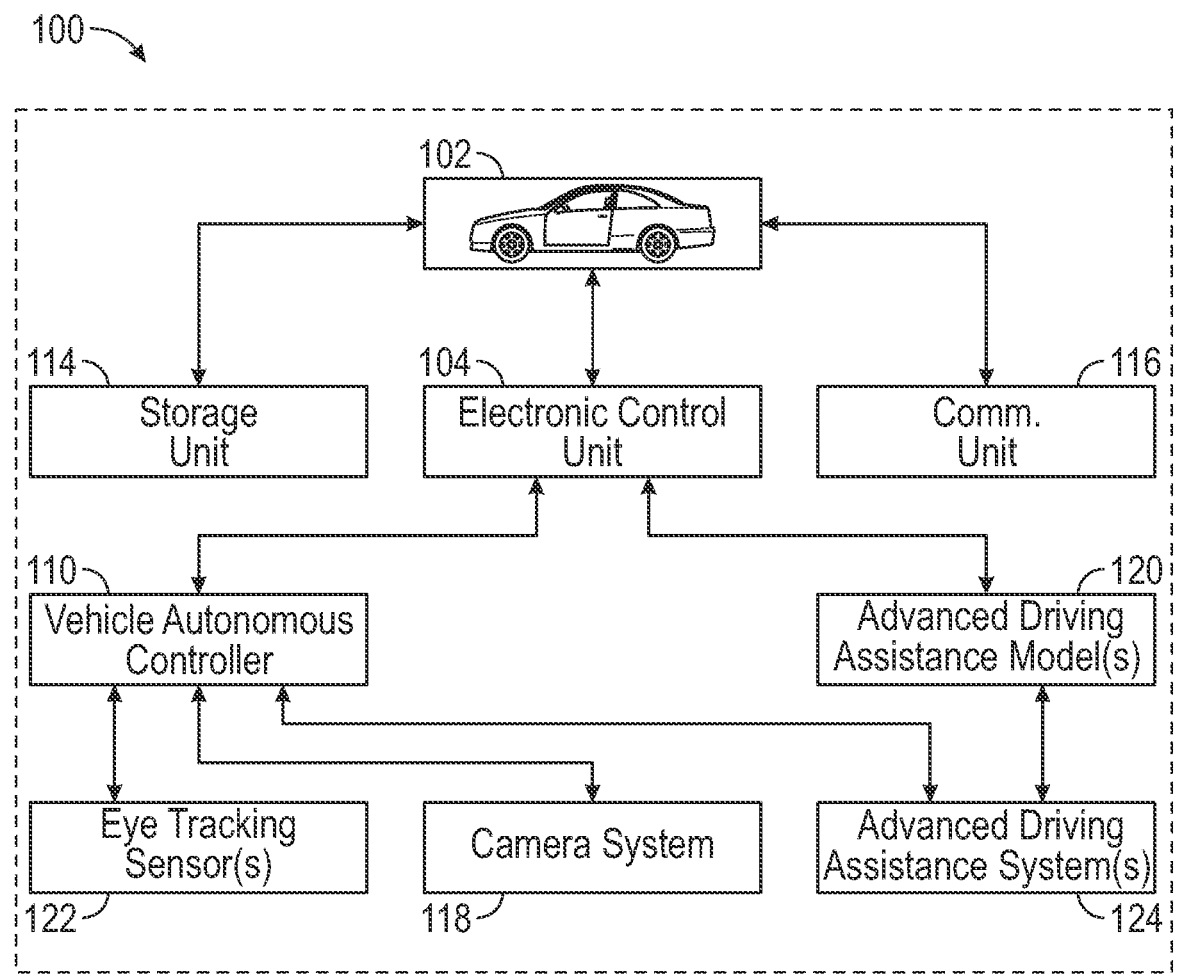
FIG. 1 is a schematic view of an exemplary system for predicting a driver's awareness towards one or more road hazards according to some examples of the disclosure.

In the following description, reference is made to the accompanying drawings which form a part hereof, and in which it is shown by way of illustration specific examples that may be practiced. It is to be understood that other examples may be used and structural changes may be made without departing from the scope of the examples of the disclosure.

Reliable computational models of driver awareness have not been proposed to be utilized in various driving situations. Current practices for objective assessment of situation awareness (SA) may be empirical methods which evaluate the human operator's knowledge of the current situation by asking the operator questions about what is occurring. Some ADAS may also follow these practices and determine the situational awareness of a driver by asking questions to the driver about the current environment. Unfortunately, these types of ADAS with query-based empirical methods such as Situation Awareness Global Assessment Technique (SAGAT) have been employed mostly in simulated environments as they may be impractical for real-time applications in field studies. Asking questions while a driver operates a respective vehicle may be counterproductive and cause the driver to deviate from their primary goal of effectively operating the vehicle to focusing on correctly answering the asked questions.

For example, ADAS that question the driver, while operating a vehicle, may distract or increase the workload of the driver, and in turn, may affect driver performance. When driver Situational Awareness (SA) in hazardous situations is especially critical, query techniques in ADAS may be even less practical as they may adversely affect driver focus. Alternatively, it may be more practical to infer driver SA based on observable driver behavior (indirect measures). Eye-tracking may be one of the viable options for SA estimation as it may be applied in real-time without interrupting the ongoing task. Specifically, as will be described in more detail below, the tracking, observing, and/or monitoring of eye movement, glances, and/or fixations over time may allow for a more practical approach to inferring a driver's situational awareness with respect to one or more road hazards. Furthermore, according to the eye-mind hypothesis, there may be a close relationship between what the eyes are gazing at and what the mind is engaged with.

Therefore, reliable eye-tracking techniques that may estimate a driver's situational awareness for a particular road hazard may be beneficial. Unlike supervisory control tasks, driving may be considered a type of noticing task that involves monitoring for and responding to somewhat unexpected events happening in unknown locations. This additional complexity and unique challenge may require use of more in-depth models and features of human eye glance behavior relative to moving Objects Of Interest (OOI such as vehicles and pedestrians) on the road. Furthermore, reducing costly preprocessing (e.g., manual data reduction and annotation), which some eye glance behavior models may use, may improve the ability for ADAS to perform real-time estimations of driver SA on the road and respond in real time.

The present disclosure is directed to systems and methods for operationalizing driver eye movement based on moving objects of interest. Additional methods related to feature selection and analysis for constructing advanced driving assistance models are also disclosed. It may be important to select features that infer the situational awareness of a driver relative to one or more road hazards of interest. The presently disclosed systems and methods may be further combined with computer-vision techniques such as object recognition to fully automate eye movement data processing as well as machine learning approaches to improve the accuracy of driver awareness estimation.

FIG. 1 is a schematic view of an exemplary system 100 for predicting the driver's awareness towards one or more road hazards, according to some examples of the disclosure. The components of the system 100, as well as the components of other systems, hardware architectures, and software architectures discussed herein, may be combined, omitted, or organized into different architectures for various examples.

Generally, system 100 may include a vehicle 102 with an electronic control unit (ECU) 104 that executes one or more applications, operating systems, vehicle systems and subsystem user interfaces, among others. ECU 104 may also execute one or more ADAS models 120 that are configured to model the awareness of the driver of vehicle 102 towards one or more road hazards.

In some examples, ADAS models 120 may predict the situational awareness of the driver based on real time data received from camera system 118 and/or eye tracking sensor(s) 122. Camera system 118 may be configured to detect one or more road hazards with computer vision techniques (e.g., object detection and recognition). In some embodiments, camera system 118 may also be configured to measure eye glance characteristics of driver eye glance behavior towards one or more detected road hazards. In other embodiments, system 100 may have dedicated eye tracking sensor(s) 122 configured to measure characteristics of the driver's eye glance behavior towards one or more road hazards detected by camera system 118. System 100 may include additional sensors and systems (not shown) to detect physical road hazards and/or characteristics of the environment. In one or more embodiments, system 100 may operably control and/or use one or more ultrasonic sensors, infrared cameras, high-range radars, and/or LIDAR systems based on the types of road hazards, vehicle operating conditions, desired operating efficiency, and/or other selection criteria to detect a road hazard. Camera system 118, eye tracking sensor(s) 122, and/or additional sensors and systems of system 100 may be configured detect a range of road hazards—on and off road—based on the driving environment including, but not limited to, road type, driving geography, weather conditions, and/or other tangible or intangible environmental characteristics.

In an exemplary embodiment, advanced driving assistance system 124 may be configured to analyze the situational awareness of a vehicle's operator/driver by utilizing one or more ADAS models 120. In some examples, ADAS models 120 may predictively model and score the awareness of a driver with one or more machine learning regression based models (e.g., linear regression, polynomial regression, multi variable linear regression, and/or regression trees). In some examples, vehicle autonomous controller 110 may provide appropriate assistance or intervention (e.g., vehicle braking, turning, acceleration, and/or other types of evasive maneuvering) in response to ADAS 124 assessing the likelihood that a driver will react to the one or more detected road hazards. Eye tracking sensors 112 and/or camera system 118 may be configured to communicate with ADAS models 120, thus enabling ADAS models 120 to perform real time predictions of a driver's situational awareness based on the sensed environment. ADAS models 120 may predict and/or score the awareness of the driver based on a combination of real time measurements (e.g., camera system 118, eye tracking sensors 112, and/or additional sensors/systems of system 100), and measures over a respective period of time (e.g., time window, sliding time window, and/or rolling time window, etc.).

ECU 104 of vehicle 102 may execute one or more applications operating systems, vehicle systems and subsystem executable instructions. In some examples, ECU may include a respective microprocessor, one or more application specific integrated circuit(s) (ASIC), or other similar devices. ECU 104 may also include respective internal processing memory, an interface circuit, bus lines for transferring data, sending commands, and communicating with the plurality of components of the vehicle 102. ECU 104 may also include a respective communication device (not shown) for sending data internally to components of vehicle 102 and communicating with externally hosted computing systems (e.g., external to vehicle 102).

In some examples, data collected by one or more eye tracking sensor(s) 122 may be stored in storage unit 114 (e.g., memory, such as a computer-readable storage medium that stores instructions for the various functions or applications implemented by system 100). In one or more embodiments, the data stored in storage unit 114 may be classified at different storage levels. For example, ADAS models 120 may frequently query persistent eye tracking data for a specified time internal (e.g., eye glance data for the last 10 seconds, last 2 minutes, etc.)—since ADAS models 120 may frequently request persistent eye tracking data from storage unit 114, the eye-tracking data may be configured for fast retrieval. Data persistent in storage unit 114 that is infrequently queried by ADAS 124 and/or ADASmodels 120 may be persistent at a storage level that retrieves the queried data at a slower rate.

In some examples, ADAS 124 may communicate with vehicle autonomous controller 110 to control an autonomous operation of one or more driving functions of vehicle 102. The one or more driving functions may include, but are not limited to, steering, braking, accelerating, merging, turning, coasting, and the like. In some examples, ECU 104 may be configured to communicate with vehicle autonomous controller 110 of vehicle 102 to execute autonomous driving commands to operate vehicle 102, and autonomously control one or more driving functions of vehicle 102. ADAS 124 may instruct vehicle autonomous controller 110 to provide varying levels of intervention for the one or more driving functions of vehicle 102. In an exemplary embodiment, ADAS 124 may request, based on predicted driver awareness, that vehicle autonomous controller 110 provide no driving assistance, partial driving assistance, conditional assistance, or complete assistance. The varying levels of intervention may be determined by the predictions made by one or more ADAS models 120. In one or more embodiments, ADAS 124 may request a first level of intervention based upon the predicted awareness of the driver and after a threshold period of time has elapsed, the ADAS 124 may request a second level of interaction, different from the first level of interaction.

In some examples, ECU 104 may additionally be configured to operably control eye tracking sensors 122. Eye tracking sensors 122 may include one or more eye tracking sensors positioned to detect the presence, attention, and/or focus of the user. Eye tracking sensors 122 may include a plurality of cameras and/or projectors (not shown). The cameras and/or projectors may take images of the driver's eyes, and determine the eyes' positions and/or gaze points. Eye tracking sensors 122, among other eye-glance measures, may also determine the angular distance between a driver's gaze point and a particular road hazard.

In some examples, ECU 104 may additionally be configured to operably control camera system 118. Camera system 118 may include one or more cameras (not shown) that are positioned at one or more positions on or in vehicle 102 to capture images and/or videos of the environment. In some examples, the one or more cameras of camera system 118 may be disposed at one or more external front portions of vehicle 102. The one or more cameras of camera system 118 may be disposed at external front portions of the vehicle 102, including, but not limited to different portions of the vehicle bumper, vehicle front lighting units, vehicle fenders, and the windshield. In some examples, the one or more cameras may be configured to capture rich information about object appearances, as well as relationships and interactions between vehicle 102 and objects (e.g., road hazards) within the surrounding environment of vehicle 102.

In particular, the one or cameras that are positioned in or on the vehicle may be configured to capture images of road hazards in an environment of vehicle 102. In one or more examples, camera system 118 may transmit respective image and/or video data to ADAS 124, after which ADAS 124 may utilize one or more ADAS models 120 to predict driver awareness and/or confidence of the captured data.

In an exemplary embodiment, ADAS models 120 may be selected based on selection criteria including, but not limited to, the type of detected road hazard, defining characteristics of the road hazard, and/or the geographical location of vehicle 102. Some ADAS models 120 may be designed such that the model will yield a more accurate prediction of driver awareness when certain characteristics and/or categories of a road hazard are satisfied, and a less accurate prediction when the model is applied to road hazards do not satisfy these characteristics and/or categories.

In one or more examples, ADAS models 120 may execute some or all of the required computations on a remote server (e.g., with one or more processors and memory), which can communicate with ECU 104 via communication unit 116. ECU 104 can transmit and/or receive appropriate information from communication unit 116 for action by ADAS 124.

The following portions of the disclosure relates to some of the techniques that may be used for generating advanced eye-tracking models and operationalizing these models in advanced driving assistance systems. As shown above, FIG. 1 describes an exemplary system for performing real time predictions of a driver's situational awareness towards a detected road hazard, and based on the predictions providing varying levels of assistance/intervention. To efficiently predict the situational awareness of a driver, spatial and/or temporal measures of a driver eye glance behavior may be defined. Data related to the defined spatial and/or temporal measures may be collected in an environment as described in FIG. 2A. Further, it may be helpful to analyze the relationship between the collected eye glance behaviors (e.g., indirect measures of situational awareness) and direct subjective and/or objective measures of driver situational awareness. FIG. 2B and the corresponding description describe a technique for collecting data related to the selected subjective and/or objective direct measures. The predictive relationship between the indirect eye glance measures and the direct measures of situational awareness may be associated with real time information and historical information (e.g., one or more time periods). FIG. 2C graphically illustrates example observed eye glance features over time towards multiple road hazards.

Figure 3B:
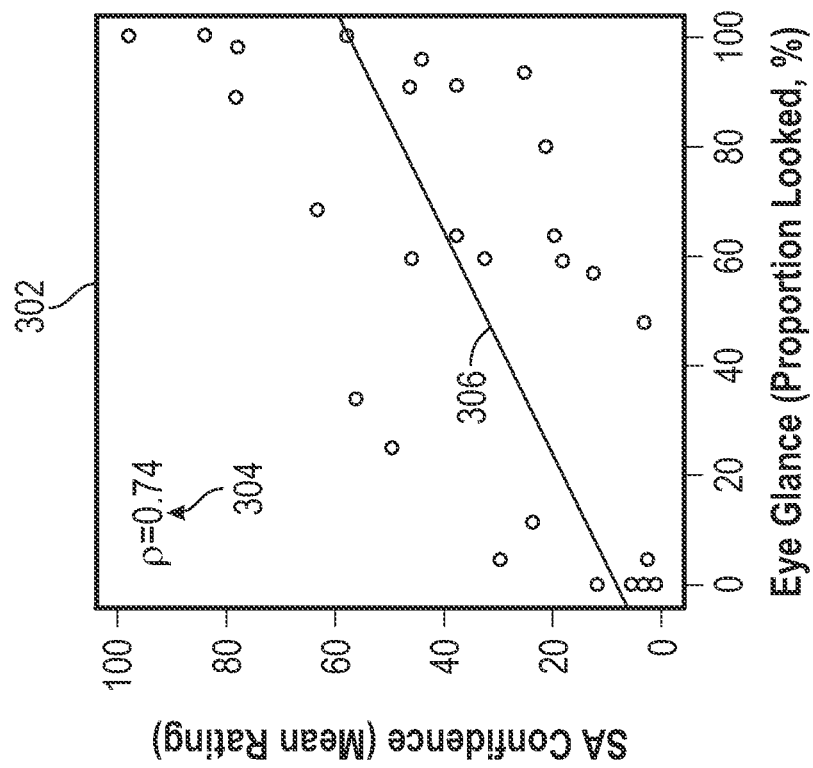
FIG. 3B illustrates example correlations of eye glance behavior, Look, to the objective dependent measure SA score and the subjective dependent measure SA confidence at the object level according to some examples of the disclosure.
Figure 3B:
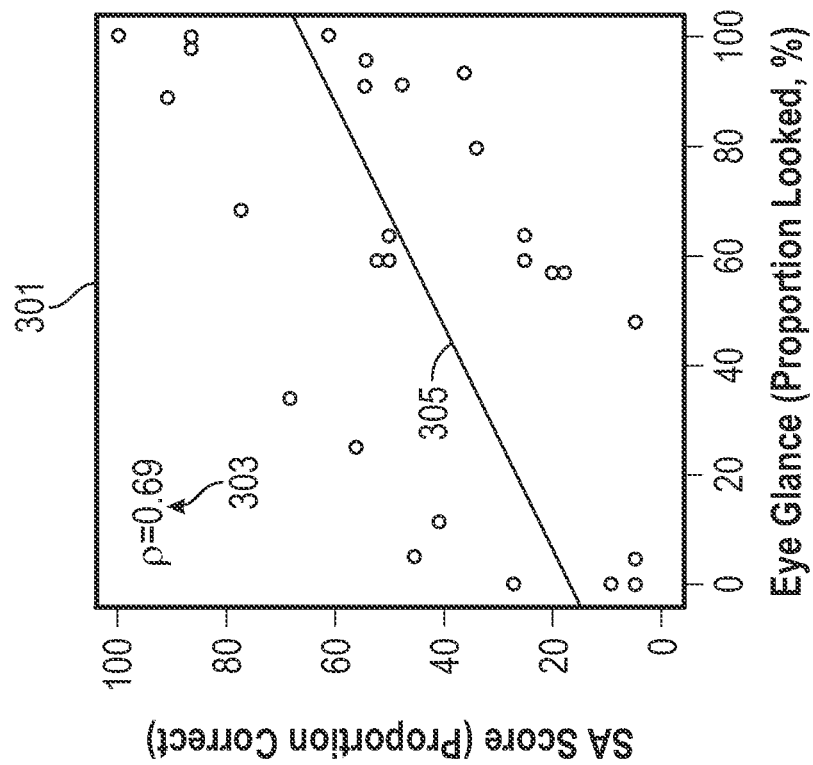
Figure 4B:
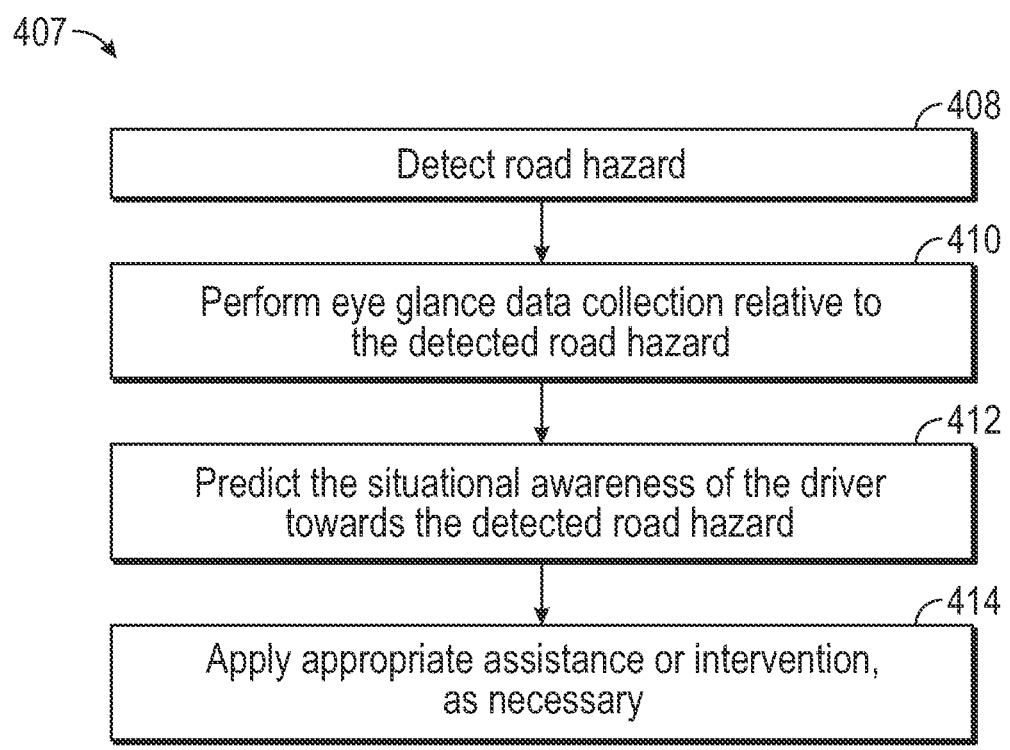
FIG. 4B illustrates an example flow diagram for an example process for predicting a driver's situational awareness towards one or more road hazards according to some examples of the disclosure.

Prior to incorporating eye glance features into one or more ADAS models, it may be important for the relationship between direct measures and indirect measures of the observed/collected data be quantified. FIGS. 3A-3C describes one or more techniques that may be used for assessing the significance of real time and near real time eye glance data. FIGS. 4A-4B describe exemplary processes for analyzing the relationship between the direct and indirect measures; constructing one or more predictive models based on the observed relationship; and operationalizing the constructed predictive models in a real time driving scenario.

Figure 2A:
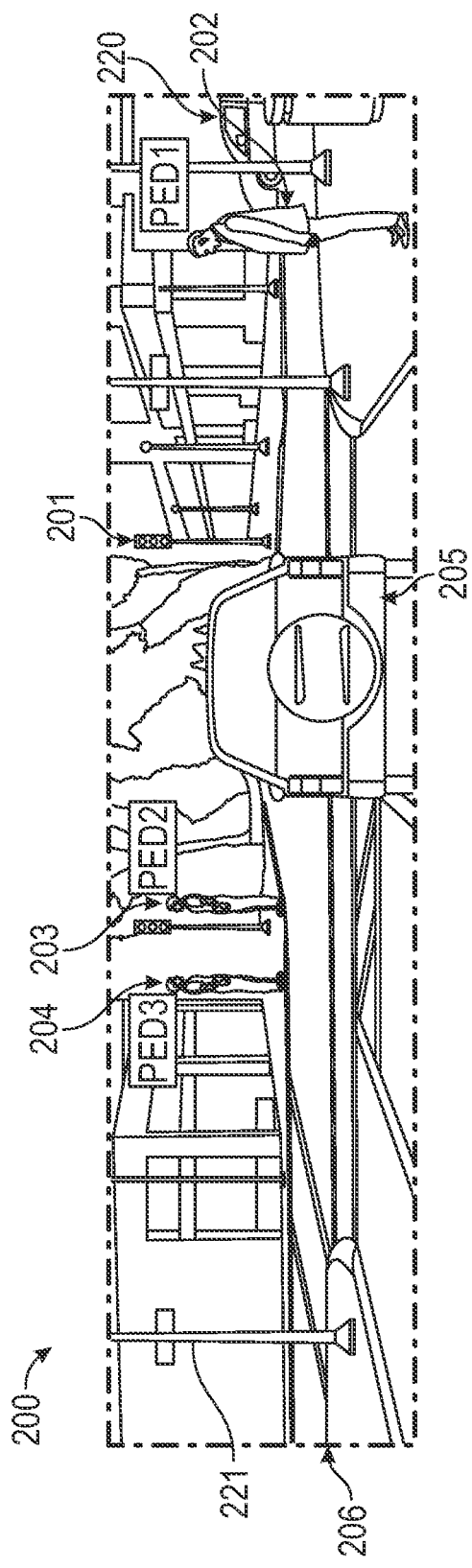
FIGS. 2A-2C illustrate an example technique for collecting indirect measures of eye glance behavior, as well as objective and subjective measures of driver awareness according to some examples of the disclosure.
Figure 2B:
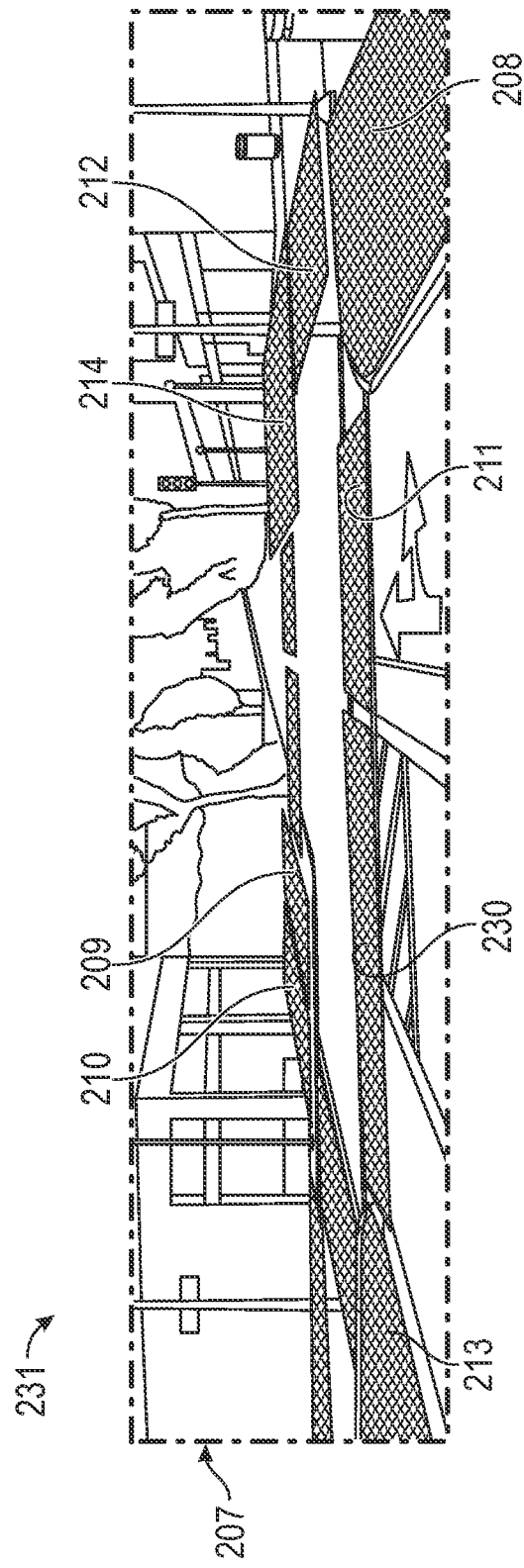
Figure 2C:
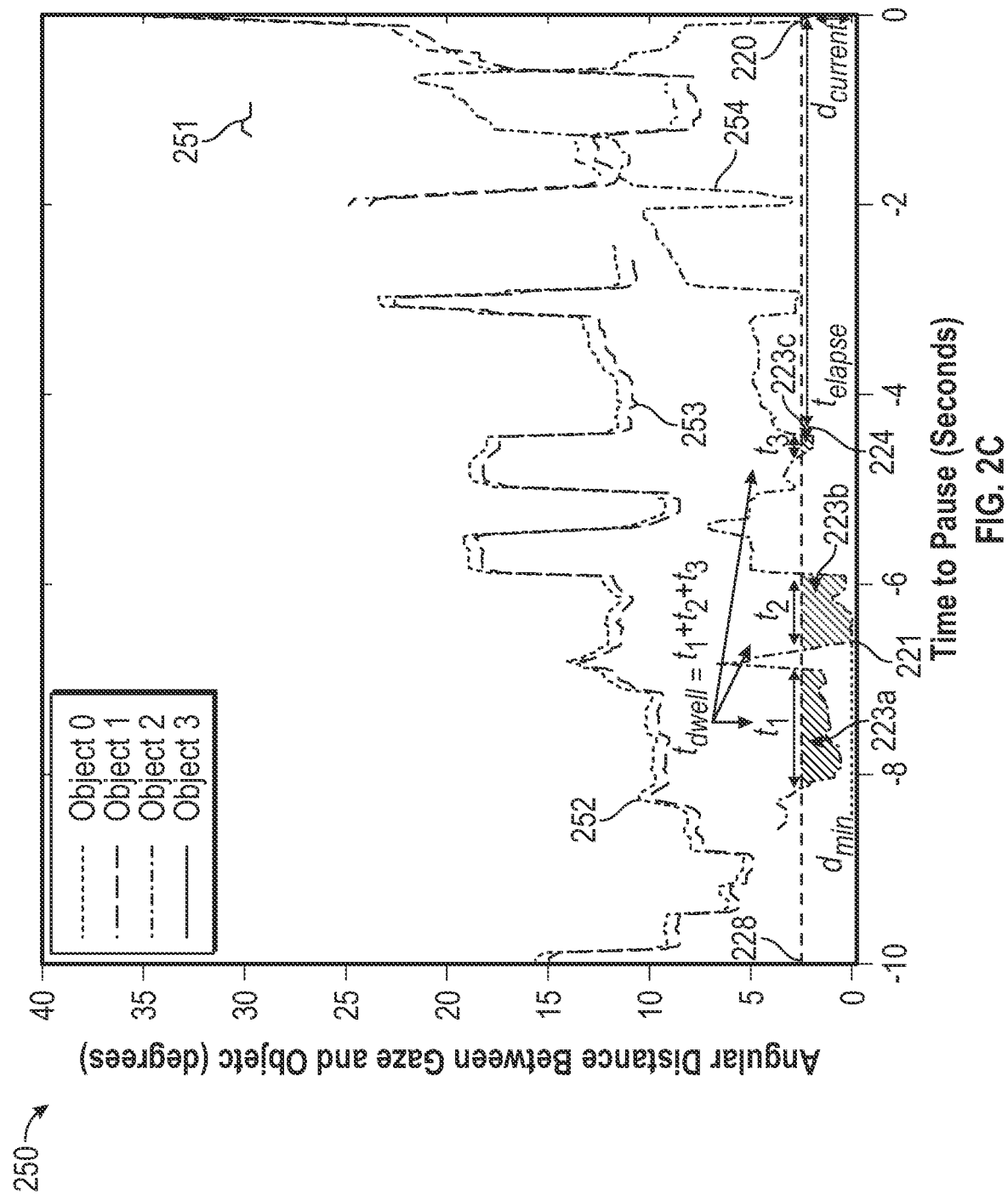

FIGS. 2A-2C illustrates an example technique for collecting indirect measures of eye glance behavior, as well as direct objective and subjective measures of driver awareness. FIG. 2A illustrates an example simulated driving environment 200 that includes road objects and hazards from the perspective of a driver. Simulated driving environment 200 may include various road hazards including (but not limited to) changing speed limits (not shown); traffic light(s) 201; street poles 221; crossing pedestrian(s) 202, 203, and 204; braking and/or cutting-in lead vehicle(s) 205 and 220; and/or cross-traffic at intersections (not shown). The ADAS models of the disclosure (e.g., previously described as 120 of FIG. 1) may more accurately predict a driver's real time awareness towards one more road hazards 201, 202, 203, 204, 205, 220, and/or 221 when the relative impact of each modeled eye glance feature is understood. It may be advantageous to incorporate features into the ADAS models that have been analyzed to be of statistical significance in predicting a driver's situational awareness. The incorporation of statistically significant features into advanced driving assistance model(s) may increase model accuracy, enable less computation time, and thus, facilitate faster model predictions.

Quantifying the correlation that exists between one or more eye glance features and a driver's subjective and/or objective awareness of road hazards 201, 202, 203, 204, 205, 220, and/or 221 may require data collection, correlation, and/or regression techniques prior to adding one or more eye glance features to an advanced driving assistance model. To quantify such correlation, in some examples, the relationship between one or more indirect measures (e.g., eye-tracking features) and direct measures of driver awareness (e.g., dependent variables based on the SAGAT approach) may be analyzed.

In one or more examples, the collection of relevant data (independent and dependent measures) may be performed in simulated driving environment 200, in which a vehicle cab (not shown) may be embedded into a wide field of view projection space. In some examples, to maintain the ecological validity of simulated driving environment 200, real world driving videos 206 may be projected onto a large curved wall along with a small crosshair (not shown) that may be controlled by the driver. A speedometer (not shown) may also be projected that replays the vehicle speed recorded in real world driving videos 206. The eye movements of the driver may be recorded and tracked with eye tracking sensor(s) 122 of FIG. 1, as previously described.

In some embodiments, the ADAS models may train on previously observed data and/or one or more additional training runs. Additional training runs (e.g., model re-tuning and/or model re-fitting) may be performed periodically to include real time driving data and decisions made by the driver. For example, real time driving data may be merged with one or more original data sets to include information not previously known to the model (e.g., new road hazards, new driving conditions, new driving habits, etc.). In one or more examples, real time driving data may be continuously merged, in real time, with one or more data sets for the one or more models to improve prediction accuracy in unfamiliar situations and environments.

In an exemplary embodiment, a data set may be constructed from a plurality of drivers' indirect eye tracking measurements (features) and/or direct verbal responses (labels) relative to one or more road hazards of interest. Each driver of the group of drivers may vary in age, driving experience, and/or other demographic features. The simulated driving test may also comprise one or more data collection sessions. For example, a driver may provide demographic related information during one session, acclimate to the simulated driving environment during another session, and perform driving missions in another.

During the simulated driving session, each driver of the group of drivers may conduct driving tasks (e.g., wayfinding missions) during which simulated driving environment 200 may be paused at random time points to collect direct subjective and/or subjective measures of driver situational awareness (dependent variables of the model). Randomly pausing the display of simulated driving environment 200 may allow for the assessment of a driver's actual situational awareness of road hazards. As will be discussed in FIG. 2B, direct query-based techniques (e.g., SAGAT) may be used to collect data about the driver's awareness of road hazards 201, 202, 203, 204, 205, 220, and/or 221, for example.

In one or more examples, the drivers may perform wayfinding missions in unfamiliar environments to simulate the real world demand of driving in unfamiliar environments. Drivers may also control the steering wheel of the vehicle cab to match the movement of the projected crosshair as well as the pedals of the vehicle cab to mimic the speed of the projected speedometer. During simulated driving environment 200, data may be collected corresponding to the driver's direct and/or indirect features corresponding to control inputs (e.g., steering wheel and pedals), eye glance measures, and/or awareness of one or more road hazards.

FIG. 2B illustrates an example perceptual matching technique for directly assessing a driver's situational awareness. Perceptual matching technique 231 may remove the road hazards experienced in simulated driving environment 200 (at a pause), which may be replaced with placeholder images similar to 230 to evaluate driver awareness. Perceptual matching scene 207 may remove the road hazards displayed in driving scene 206, and replace reach road hazard of FIG. 2A with a corresponding placeholder image similar to 230. For example, dynamic road hazards 202, 203, 204, 205, and 220 of FIG. 2A may be replaced with placeholder images 208, 209, 210, 211, and 212 respectively. Static road hazards 201 and 221, of FIG. 2A, may be replaced with placeholder images 214 and 213 respectively.

For one or more model training techniques (e.g., model fitting, model tuning, etc.), discussed later, it may be important that the collected indirect eye glance behavior measurements are relatable to one or more direct objective and/or subjective measurements of driver awareness. In other words, understanding if the collected eye glance behavior relates to an awareness of a road hazard. The perceptual matching technique of FIG. 2B may allow the direct measures of driver situational awareness to be associated with the indirect eye glance measures collected during simulated driving environment 200 of FIG. 2A. For example, simulated driving scene 206 may collect eye glance data over time, and to associate the collected data to the driver's actual objective and subjective situational awareness, dependent variables (model variables) described later may be used.

At random time intervals, simulated driving environment 200 may be paused, and the displayed road hazard(s) may be replaced with placeholder images 210. To directly assess objective and subjective measures of the driver's actual situational awareness, one or more direct query based approaches may be used (e.g., SAGAT) along with one or more perceptual matching techniques. For example, in an exemplary embodiment, while simulated driving environment 200 is paused, the driver may be questioned about observed road hazards, and/or asked to perceptually match the locations of one or more road hazards 201, 202, 203, 204, 205, 220, and 221 with the one or more placeholder images similar to 230. In one or more examples, measures corresponding to a driver's confidence and/or accuracy of awareness towards the road hazards may be added to the dataset, as will be described below.

The data set may allow ADAS models to gradually learn the relationship between the features (e.g., indirect eye glance measures) and labels (e.g., direct measures of driver situational awareness) for each observation in the dataset. In one or more examples, the data set generated from the simulated environment of FIGS. 2A-2B may allow ADAS models to make an inference (prediction) about the situational awareness of the driver for a group of one or more unlabeled eye glance measures. Details about possible features and labels for the dataset will be described below.

In one or more examples, driver awareness and/or eye glance behavior measures relative to each OOI (road hazards 201, 202, 203, 204, 205, 220, and/or 221) during simulated driving environment 200 may be quantified by, but not limited to, the indirect and/or direct measures described below.

In human interaction with dynamic environments, objective SA (what you know) and/or subjective SA (knowing what you know) may play important roles in how a human will respond in the dynamic environment. In the driving context, for example, drivers' belief about their own SA may affect their subsequent behavior to seek (or not seek) more evidence prior to action. Based on these principles, it may be important to predict a driver's objective situational awareness score and/or subjective situational awareness score. For example, ADAS may analyze if the driver is aware of a crossing pedestrian detected by camera system 118, and the confidence related to the awareness of the crossing pedestrian. Therefore, measures associated with the objective and/or subjective aspects of driver SA may be needed to interpret the relationship that may exist with eye glance features. In an exemplary embodiment, a situational awareness (SA) score may be defined as a binary score (0/1) of the driver's accuracy of awareness towards a road hazard (objective direct measure). Additionally, a situational awareness (SA) confidence score may be defined as the self-reported confidence level (0-100) of their awareness towards one or more road hazards (subjective direct measure). SA score and SA confidence may be collected for each driver for one or more road hazards while simulated driving environment 200 is paused. In some examples, objective SA score and subjective SA accuracy measures may be collected and assigned based on verbal responses from the driver.

The SA score may represent the objective accuracy of driver awareness and may be assigned by evaluating each answer to a given question against the ground truth of the situation (correct vs. Incorrect). The SA confidence may represent a driver's belief about their awareness of the detected hazard. For example, if a driver was able to perceptually match pedestrian 202 of FIG. 2A to the correct placeholder image 210 with a 60% confidence, the data collection technique may assign an encoded value of 1 for a driver SA score and an encoded value of 60 for SA confidence towards pedestrian 202. For incorrectly localized road hazards, the data collection technique may assign an encoded value of 0 for both the SA score and confidence to account for the driver's misunderstanding about the road hazard.

In some examples, measures that indirectly describe the temporal, spatial, and/or deterioration (SA decay) aspects of a driver's situational awareness may be collected from the eye tracking sensor(s), as previously discussed. In an exemplary embodiment, to feature temporal and/or spatial aspects of a driver's visual attention and consider the possible deterioration of SA over time (the SA decay model), the data collection technique may compute (but is not limited to) one or more of the following features of driver eye glance behavior relative to each OOI within a specified time window (e.g., 5 seconds, 10 seconds, 30 seconds, 60 seconds, etc.) before simulated driving environment 200 is paused:

(1) $d_{current}$: gaze distance from a hazard at a pause (°),
(2) $d_{min}$: minimum gaze distance from a hazard within the time window (°),
(3) $t_{elapse}$: elapsed time since the last fixation on a hazard at a pause (sec.),
(4) $t_{dwell}$: fixation dwell time on a hazard within the time window (sec.), and/or
(5) Look: whether or not a hazard is visually sampled (binary, 0/1).

By way of example, the feature $d_{current}$ may represent the angular distance between a road hazard in FIG. 2A and the gaze point of the driver (at a pause); the feature $d_{min}$ may represent the minimum gaze distance observed towards a road hazard in FIG. 2A for a respective time period, prior to pausing simulated driving environment 200; the feature $t_{elapse}$ may represent an elapsed time in seconds since the driver last fixated on a road hazard in FIG. 2A (e.g., time since last gaze point was within 2.5° of the road hazard); the feature $t_{dwell}$ may represent the total time the driver fixated on a road hazard in FIG. 2A; and Look may represent a binary value if the gaze of the driver fixated on a road hazard in FIG. 2A within a 2.5° angular distance threshold fora specified period of time (e.g., 120 ms, 240 ms, 480 ms, etc.).

FIG. 2C graphically illustrates example observed eye glance features in relation to one or road objects over time. A driver may observe one or more road hazards while interacting with simulated driving environment 200. Graph 250 may display the change in angular distance between the gaze point of a driver and each observed road hazard over time. For example, each plot line 251, 252, 253, and 254 may represent the change in a driver's eye gaze distance, from a specific road hazard, over time. The eye glance measures $d_{current}$, $d_{min}$, $t_{elapse}$, and/or $t_{dwell}$ may be reflected for each plot line of graph 250.

Gaze distance features ($d_{current}$ 220 and $d_{min}$ 221) may capture spatial characteristics of driver eye glance behavior and measure the angular distances of each road hazard from the driver's gaze position. For example, in graph 250, the driver's minimum gaze distance observed towards road hazard 254 ($d_{min}$) may be reflected by the angular distance value corresponding to point 221, and the driver's current gaze distance (at a pause) from road hazard 254 ($d_{current}$) may be reflected by the angular distance value corresponding to point 220.

Temporal characteristics of driver eye glance behavior may be featured and measured by fixation time variables ($t_{elapse}$ and $t_{dwell}$) and which may assume that object perception may require fixation of gaze within the human fovea (2.5° in the field of view). For example, in graph 250 the elapsed time since the last fixation ($t_{elapse}$) on road hazard 254 may be reflected as the time difference between the paused time and the time corresponding to point 224 (last occurrence when a driver's gaze was directed towards road hazard 254 within the 2.5° angular distance threshold 228), and the fixation dwell time ($t_{dwell}$) on a hazard, within the respective time window, may be reflected as the summation of time when road hazard 254 was observed within the 2.5° angular distance threshold 228 (e.g., shaded region 223(a)+shaded region 223(b)+shaded region 223(c)).

Additionally, in one or more examples, spatial and/or temporal characteristics of driver eye glance relative to a given OOI may be combined to define a binary feature Look (not shown), which may represent the visual sampling of the hazard. The data collection technique may assign a 1 for instances where the driver eye glance resides within 2.5° distance from a road hazard for more than 120 ms.

In one or more examples, manual and/or automated methods may be used to collect the eye glance measures described above. For example, in an exemplary embodiment, the data collection technique may manually annotate and track the OOIs over a respective time window (before each pause) in the driving videos. The data collection technique may also perform automatic gaze registration to project the gaze onto the fixed scene perspective (e.g., the simulated driving videos displayed during the experiment), since the gaze of the driver may be captured in the driver perspective camera (e.g., eye tracking sensors). In one or more examples, after annotating the OOIs and projecting the driver's gaze, the OOIs and gaze may be in the same frame of reference.

Further, at every time step within a respective time window before each pause, the data collection technique may calculate the distance between any one the driver's gaze and any annotated OOI, and create a plot of gaze distance over time (e.g., plot line 251, 252, 253, and 254 of FIG. 2C). The data collection technique may also obtain a range of plots over all the drivers and all annotated OOIs, and graph a singular gaze distance plot. The data collection technique may also compute/derive the measures for each observed road object $d_{current}$, $d_{min}$, $t_{elapse}$, $t_{dwell}$, and look by deriving the respective eye glance measure through manual and/or automatic methods.

Correlation analyses may be performed on the direct measures (described in FIG. 2B) and indirect measures collected in simulated driving environment 200 of FIG. 2A (discussed in FIG. 2C), to determine if the computed/derived eye glance features ($d_{current}$, $d_{min}$, $t_{elapse}$, $t_{dwell}$, and Look (not shown)) are associated with the direct measures of driver awareness towards the road hazards.

Regression analyses, discussed later, may also be performed to examine what tracked or derived eye glance features explain driver awareness. The data collection technique may be conducted at three different levels: (1) the individual event from each driver for each road hazard, (2) the object level where the collected data is averaged across drivers for each object (e.g., road hazard), and (3) the driver level where the data is averaged across objects for each driver.

The method may conduct additional analyses on the aggregated data and compare results from analyses at different levels to better understand the relationship between the derived eye glance measures and driver awareness. This multilevel approach may be adopted for eye glance behavior analysis and may be based on the principle of aggregation which may explain the increased predictive validity when the predictors and outcome are averaged across multiple measurement instances.

FIG. 3A summarizes example determined correlation values between example derived eye glance measures and example driver's awareness at the individual event, object, and driver level. In one or more examples, Spearman's Rank Correlation ($\rho$) may be used to assess the relationship between the situational awareness score (dependent objective measure) and any one of the defined eye glance measures. Additionally or alternatively to the one or more examples described above, Spearman's Rank Correlation ($\rho$) may be used to assess the relationship between the situational awareness confidence score (subjective dependent measure) to any one of the defined eye glance measures. Additionally or alternatively to the one or more examples described above, Pearson's Product Moment Correlation (r) coefficient may be used to measure the linear relationship (trend) between SA score and/or SA confidence and any of the defined eye glance measures. Additionally or alternatively to the one or more examples described above, the correlation value between two variables/features may be significant when the Spearman's rank correlation value ($\rho$) is less than 0.05. Additionally or alternatively to the one or more examples described above, the correlation between two variables/features may be considered strong when Spearman's rank correlation value ($\rho$) is greater than or equal to 0.5; moderate when p is less than 0.5 and greater than or equal to 0.3, and weak when p is less than 0.3.

In an exemplary embodiment, correlation values may be determined by the techniques discussed above on the data set collected during the simulated driving sessions. The correlation value between the eye glance feature Look (indirect measure) and a driver's subjective SA confidence (direct measure) may indicate a stronger positive correlation than the correlation value between Look (indirect measure) and a driver's objective SA score (direct measure) at the object level (e.g., confidence and look correlation value of $\rho=0.74$ vs. SA score and look correlation value of $\rho=0.69$, see FIG. 3B and corresponding description). It also may be true that the correlation value between objective SA score (direct measure) and the eye glance feature Look (indirect measure) may be strong at the object level (e.g., $\rho=0.69$, see FIG. 3A), moderate at the event level (e.g., $\rho=0.33$, see FIG. 3A), and weak at the driver level (e.g., $\rho=0.29$, see FIG. 3A). It may also be true that correlation values for the simple binary indicator Look (e.g., $\rho=0.69$) and more comprehensive eye glance features indicate strong correlation with driver SA score (e.g., $\rho=-0.52$, $-0.66$, and 0.64 for $d_{current}$, $d_{min}$, and at the object level. However, at the participant level, the correlation values between comprehensive measures of driver eye glance behavior and driver SA score may show no or weak correlation ($\rho$=−0.17, −0.15, −0.31 and 0.17 for $d_{current}$, $d_{min}$, $t_{elapse}$, and $t_{dwell}$).

A correlation value may be computed, as just described, for any one direct measure and/or any one eye glance feature. The correlation value may correspond to a strong positive or negative correlation between an eye glance measure and a situational awareness score and/or confidence. If the correlation value is greater than a threshold (e.g., correlation is strong or moderate), then the indirect measure may be added as a feature to one or more advanced driving assistance models (e.g., ADAS models 120). If the correlation value is not greater than a threshold (e.g., correlation is weak), then the indirect measure may not be added as a feature to the one or more advanced driving assistance models.

FIG. 3B illustrates example correlations of eye glance behavior (Look) to the objective dependent measure situational awareness score and the subjective dependent measure situational awareness confidence at the object level. Each data point of graph 301 and 302 may represent observed road hazards. Graph 301 may represent the correlation between eye glance behavior Look and the objective accuracy awareness. Graph 302 may represent the correlation between eye glance behavior look and the subjective confidence in awareness.

Utilizing the Spearman's correlation coefficient approach, described above, Graph 301 may show, on average, that an increase in the number of drivers who Look (defined above) at a respective road hazard may be able to more accurately localize a road object. Similarly, utilizing the Spearman's correlation coefficient approach, Graph 302 may show that, on average, an increase in the number of drivers who Look (defined above) at a road hazard may have a higher confidence in their awareness of the road hazard. Spearman's rank correlation value 303 (e.g., $\rho$=0.69) of graph 301 vs. correlation value 304 (e.g., $\rho$=0.74) of graph 302 may show that the eye glance measure look is less correlated to SA score than with SA confidence, at the object level. Trend line 305 and 306 of graph 301 and 302, respectively, may show an increasing positive relationship between the proportion of drivers who Look at a road object and the corresponding SA score and SA confidence.

One or more predictive linear regression models may be fitted to the data set collected above. In one or more examples, fitting a predictive model to an observed data set may include determining a function that relates a set of input variable(s) to an output variable that corresponds with the observed input and output values of the data set. In one or more embodiments, the input values may be the indirect eye glance measures: $d_{current}$, $d_{min}$, $t_{elapse}$, $t_{dwell}$, and/or Look. In one or more embodiments, the output values may be one or more of the direct measures: SA score and/or SA confidence.

FIG. 3C summarizes example performance for the fitted linear regression models at the object level. In one or more examples, simple linear regression models may be fitted to predict dependent variables (SA score and/or SA confidence) with independent variable Look. Additionally or alternatively to one or more of the examples of above, in some examples, multi variable regression models may be fitted to predict dependent variables (SA score and/or SA confidence) with independent variables $d_{current}$, $d_{min}$, $t_{elapse}$, and/or $t_{dwell}$.

It may be observed that the fitted linear regression models at the individual event level and the object level share similar trends and performance, which will be discussed below. At the driver level, however, the fitted predictive linear regression models may not be able to explain the variance in the data (e.g., $R^2_{adj}$ of 0.098 for SA score and 0.054 for SA confidence). It may also be observed that the linear models better explain SA confidence than SA score (e.g., $R^2_{adj}$ of 0.0424 vs. 0.391 for the simple regression models and $R^2_{adj}$ of 0.526 vs. 0.515 for multiple regression models). The fitted linear models that include comprehensive eye glance feature variables may perform better predictions on driver situational awareness than the models that include only the simple binary predictor Look ($R^2_{adj}$=0.515 vs. 0.391 for SA score and 0.526 vs. 0.424 for SA confidence). In one or more examples, the fitted linear regression models with the best fit (e.g., adjusted $R^2$) may be selected as an advanced driving assistance model, as discussed in FIG. 1.

The fitted simple linear regression models may also find the binary indicator of visual attention (Look) to be a positive predictor of both driver SA score ($\beta$=0.493, p<0.001) and SA confidence (13=0.494, p<0.001). These models may be interpreted such that a one percent increase in the proportion of drivers who looked at road hazards may be associated with a 0.493 percent increase in the proportion of drivers who successfully localized road hazards, for example.

The fitted models may have also identified two eye glance measures that are negatively associated with the driver SA and confidence. For example, a multiple regression model may predict negative effects of $d_{min}$ (e.g., $\beta$=−3.380, $\rho$=0.005, see FIG. 3C) and $t_{elapse}$ (e.g., $\beta$=−7.857, $\rho$=0.015, see FIG. 3C) on SA confidence. This suggests that on average a one degree increase in the minimum angular distance of a road hazard may be associated with a 3.380 percent decrease in the drivers' confidence in their SA. Further, a one second increase in the elapsed time since last fixation on a hazard may be associated a 7.857 percent decrease in the drivers' confidence in their awareness of the hazard. ADA systems may provide assistance or intervention techniques that minimize the negative impact one or more model features may have on the confidence and awareness of a driver, and promote the model features that have positive impacts on the confidence and awareness of a driver.

FIG. 4A illustrates an example flow diagram for an example process a process 401 for generating one or more predictive models (e.g., ADAS models 120). In FIG. 4A, process 401 includes, at 402, defining relevant objective and/or subjective features (direct measures) of driver situational awareness. Relevant objective and/or subjective features may be defined based upon the goal of the one or more models. If the goal of one or more models is to predict whether the driver is aware of a hazard and/or localized the hazard, a relevant dependent measure may be a situational awareness score. The situational awareness (SA) score may be defined as a binary score (0/1) of the driver's accuracy of awareness towards a road hazard. If the goal of the one or more models is to predict whether the driver is confident about their awareness of a road hazard, a relevant dependent measure may be situation awareness (SA) confidence. Situational awareness (SA) confidence may be defined as the self-reported confidence level (0-100) of a driver's awareness towards one or more road hazards.

At 403, generating one or more predictive models may include defining relevant spatial and/or temporal features (indirect measures) of driver eye glance behavior. Spatial and/or temporal features may be defined based upon one or more goals of the predictors. By way of example, if the goal of a predictor is to represent the angular distance between an observed road hazard and the gaze of the driver, $d_{current}$ may be a relevant spatial feature. Additionally or alternatively, to the one or more examples described above, if the goal of a predictor is to represent the minimum gaze distance observed towards a road hazard for a respective time period, $d_{min}$ may be a relevant spatial feature. Additionally or alternatively, to the one or more examples described above, if the goal of the predicator is to represent an elapsed time in seconds since the driver last fixated on a road hazard, $t_{elapse}$ may be a relevant temporal feature. Additionally or alternatively, to the one or more examples described above, if the goal of the predictor is to define a total time the diver fixated on a road hazard during a time window, $t_{dwell}$ may be a relevant temporal feature. Additionally or alternatively, to the one or more examples described above, if the goal of the predictor is to represent a binary value that combines spatial and temporal characteristics, Look may be a relevant feature.

At 404, manual or automated methods for data collection and processing may be performed for the relevant features, relative to one or more road hazards. In some examples, data collection techniques may include manually annotating and tracking OOIs over a respective time window and performing automatic gaze registration to project the gaze onto the fixed scene perspective, such that the OOIs and the gaze of the driver may be in the same frame of reference. The data collection process step may also calculate the distance between any one driver's gaze and any annotated OOI, generate plots of gaze distance over time. The data collection technique may also obtain a range of plots over all the drivers and all annotated OOIs, and graph a singular gaze distance plot. The data collection technique may also compute/derive the measures for the defined relevant spatial and/or temporal features in 403.

At 405, correlation and/or regression analyses may be performed between the defined direct measures at 402 and the indirect measures at 403. Performing correlation and/or regression analyses may allow for the association of the direct measures and indirect measures to be analyzed. The correlation between the direct measures and indirect measures may be determined by Spearman's Rank Correlation and/or Pearson's Product Moment Correlation. In some embodiments, the correlation value between two variables/features may be significant when the Spearman's Rank Correlation value ($\rho$) is less than 0.05. Additionally or alternatively to the one or more examples described above, the correlation between two variables/features may be considered strong when Spearman's Rank Correlation value ($\rho$) is greater than or equal to 0.5; moderate when p is less than 0.5 and greater than or equal to 0.3, and weak when p is less than 0.3.

At 406, one or more predictive models may be generated to operationalize driver eye movement. In one or more examples, simple linear regression models may be fitted to predict direct measures defined at 402 with indirect measures defined at 403. Additionally or alternatively to one or more of the examples of above, in some examples, multi variable regression models may be fitted to predict direct measures defined at 402 with indirect measures defined at 403. In some examples, the one or more models may perform predictions of dependent measures based on indirect measures that include real time information and historical data. Relevant model features may be determined at 405, if the correlation value is greater than a threshold correlation value then the indirect measure defined at 403 may be included in the model. If the correlation value of an indirect measure defined at 403 does not meet a threshold correlation value then the indirect measure may not be included in the model.

FIG. 4B illustrates an example flow diagram for an example process 407 for predicting a driver's situational awareness towards one or more road hazards. In FIG. 4B, process 407 includes, at 408, detecting a road hazard. The advanced driving assistance system (e.g., system 124) may detect various road hazards including (but not limited to) merging vehicles, crossing pedestrians and animals, objects that have fallen from another vehicle, construction debris, and the like. The advanced driving assistance system may detect a road hazard utilizing camera system 118 or other additional sensors and systems (e.g., ultrasonic sensors, infrared cameras, high-range radars, and/or LIDAR systems), as discussed in FIG. 1.

At 410, the advanced driving assistance system may perform data collection for one or more advanced driving assistance models (e.g., ADAS models 120). The sensors of system 100 may be used to collect the data required for one or more model features, in one or more time windows, and the data may be stored on storage unit 114. When a road object is detected in 408, the advanced driving assistance system may utilize one or more ADAS models to predict the driver's objective and/or subjective understanding of the detected road hazard. The input values of the ADAS models may be spatial and/or temporal measures of the driver's eye glance behavior at one or more time periods towards the detected road hazard at 408. The ADAS may retrieve the real time eye glance measures from the vehicle's camera system, eye tracking sensors, and/or additional sensors/systems of System 100. In some cases, the model may also require near real time eye glance data according to a determined time window. For example, the ADAS models may require aggregated measures, such as the total amount of time a driver gazed at a road hazard over a respective time window. The ADAS may collect aggregated measures (e.g., the driver's dwell time over the last 10, 20, and/or 30 seconds) from storage unit 114.

At 412, one or more ADAS models may take as an input the sensor data collected at 410, and predict the subjective and/or objective driver awareness of the detected road hazard. One or more ADAS models may predict the likelihood that a driver is aware of the detected road hazard and/or the driver's confidence of awareness related to the detected road hazard at 408. In one or more examples, the ADAS may aggregate and/or average the prediction of one or more simple linear regression, multi-variable linear regression models, and/or or other machine learning models to assess the driver's objective and/or subjective situational awareness. Additionally or alternatively to the one or more examples described above, the ADAS may prioritize the prediction of one ADAS models over the other ADA models. Similar, a prediction score of one or more first ADAS models may trigger one or more second ADAS models, different than the one or more first ADA models, to perform a prediction. For example, if a prediction is preformed about the driver's awareness of a road hazard and it is predicted that the driver is aware of the road hazard, the advanced driving assistance system may request that one or more ADA models perform a prediction of the confidence of the driver's awareness of the road hazard.

At 414, the ADAS may compare the predicted driver's awareness and/or confidence to one or more system thresholds. If the predicted driver awareness and/or confidence towards a respective road hazard do not satisfy the threshold criteria, the advanced driving assistance system may request that the vehicle autonomous controller provide appropriate intervention or assistance. In an exemplary embodiment, an advanced driver assistance system such as a heads up display system for forward collision warning may make the driver aware of road hazards by notifying the user (e.g., displaying, via the heads up display, information) about a road hazard when the predicted driver awareness score does not satisfy the threshold criteria. Similarly, if the predicted driver awareness satisfies the threshold criteria (indicating the road hazard is known by the driver) then the heads up display system may not bring attention to the road hazard (e.g., may not display information about the road hazard). Advantages for incorporating driver awareness into a heads-up display system may include the highlighting of road hazards that are not known to the driver and/or reducing unnecessary redundant reminders about road hazards that are already known to the driver.

In another exemplary embodiment, an advanced driving assistance system such as an intelligent emergency braking system may receive prediction score(s) about the driver's awareness and/or confidence towards a detected road hazard. In response to the prediction, the intelligent emergency braking system may perform a variety of operations. For example, If the intelligent emergency braking system determines that the driver is not aware of a respective road hazard and/or may not correctly localize the road hazard, evasive maneuvering may be immediately perform such as performing autonomous emergency braking to avoid a road hazard. In another example, if intelligent emergency braking system determines that the driver is aware of the road hazard and/or is able to localize the road hazard, the intelligent emergency braking system may perform a further prediction about the driver's awareness confidence about the road hazard. If the prediction about driver's awareness confidence satisfies a threshold criteria, the intelligent emergency braking system may delay assistance/intervention for a specified period of time. If the intelligent emergency braking system determines that the driver does not take appropriate steps in that time period, the system may provide autonomous emergency braking assistance. If the prediction about driver's awareness confidence does not satisfy a threshold criteria, the intelligent emergency braking system may alert the driver through visual, audio, and/or haptic feedback mechanisms.

Some examples of the disclosure are directed to a non-transitory computer-readable storage medium including instructions, wherein the instructions are configured to be executed by one or more processors of an electronic device. In some examples, the instructions are for detecting, using one or more sensors, one or more first characteristics associated with a gaze of a person with respect to an object during a period of time. In some examples, the instructions are for detecting, using the one or more sensors, one or more second characteristics associated with the gaze of the person with respect to the object at a first time after the period of time. In some examples, the instructions are for determining, using a predictive model, a likelihood that the person is aware of the object based on the one or more first characteristics and the one or more second characteristics. In some examples, the instructions are for selectively performing an operation based on the determined likelihood. Additionally or alternatively to one or more of the examples above, in some examples, the one or more first characteristics and the one or more second characteristics include one or more of $d_{current}$, $d_{min}$, $t_{elapse}$, $t_{dwell}$ or Look. Additionally or alternatively to one or more of the examples above, in some examples, determining the likelihood that the person is aware of the object includes: determining an objective indication of the awareness of the person of the object using a linear regression model. Additionally or alternatively to one or more of the examples above, in some examples, determining the likelihood that the person is aware of the object includes: determining a subjective indication of the awareness of the person of the object using a linear regression model. Additionally or alternatively to one or more of the examples above, in some examples, the operation includes an autonomous driving operation. Additionally or alternatively to one or more of the examples above, in some examples, selectively performing the operation includes: in accordance with a determination that the likelihood that that the person is aware of the object does not satisfy one or more threshold criteria, performing the operation; and in accordance with a determination that the likelihood that the person is aware of the object satisfies the one or more threshold criteria, forgoing performing the operation. Additionally or alternatively to one or more of the examples above, in some examples, the one or more first characteristics of the gaze and the one or more second characteristics of the gaze are selected using objective and subjective data.

Some examples of the disclosure are directed to an electronic device including one or more processors, and memory storing instructions, which when executed by the one or more processors, cause the electronic device to perform a method. In some examples, the method includes detecting, using one or more sensors, one or more first characteristics associated with a gaze of a person with respect to an object during a period of time. In some examples, the method includes detecting, using the one or more sensors, one or more second characteristics associated with the gaze of the person with respect to the object at a first time after the period of time. In some examples, the method incudes determining, using a predictive model, a likelihood that the person is aware of the object based on the one or more first characteristics and the one or more second characteristics. In some examples, the method includes selectively performing an operation based on the determined likelihood. Additionally or alternatively to one or more of the examples above, in some examples, the one or more first characteristics and the one or more second characteristics include one or more of $d_{current}$, $d_{min}$, $t_{elapse}$, $t_{dwell}$ or Look. Additionally or alternatively to one or more of the examples above, in some examples, determining the likelihood that the person is aware of the object includes: determining an objective indication of the awareness of the person of the object using a linear regression model. Additionally or alternatively to one or more of the examples above, in some examples, determining the likelihood that the person is aware of the object includes: determining a subjective indication of the awareness of the person of the object using a linear regression model. Additionally or alternatively to one or more of the examples above, in some examples, the operation includes an autonomous driving operation. Additionally or alternatively to one or more of the examples above, in some examples, selectively performing the operation includes: in accordance with a determination that the likelihood that that the person is aware of the object does not satisfy one or more threshold criteria, performing the operation; and in accordance with a determination that the likelihood that the person is aware of the object satisfies the one or more threshold criteria, forgoing performing the operation. Additionally or alternatively to one or more of the examples above, in some examples, the one or more first characteristics of the gaze and the one or more second characteristics of the gaze are selected using objective and subjective data.

Some examples of the disclosure are directed to a method including detecting, using one or more sensors, one or more first characteristics associated with a gaze of a person with respect to an object during a period of time. In some examples, the method may include detecting, using the one or more sensors, one or more second characteristics associated with the gaze of the person with respect to the object at a first time after the period of time. In some examples, the method may include determining, using a predictive model, a likelihood that the person is aware of the object based on the one or more first characteristics and the one or more second characteristics. In some examples, the method may include selectively performing an operation based on the determined likelihood. Additionally or alternatively to one or more of the examples above, in some examples, the one or more first characteristics and the one or more second characteristics include one or more of $d_{current}$, $d_{min}$, $t_{elapse}$, $t_{dwell}$ or Look. Additionally or alternatively to one or more of the examples above, in some examples, determining the likelihood that the person is aware of the object includes: determining an objective indication of the awareness of the person of the object using a linear regression model. Additionally or alternatively to one or more of the examples above, in some examples, determining the likelihood that the person is aware of the object includes: determining a subjective indication of the awareness of the person of the object using a linear regression model. Additionally or alternatively to one or more of the examples above, in some examples, the operation includes an autonomous driving operation. Additionally or alternatively to one or more of the examples above, in some examples, selectively performing the operation includes: in accordance with a determination that the likelihood that that the person is aware of the object does not satisfy one or more threshold criteria, performing the operation; and in accordance with a determination that the likelihood that the person is aware of the object satisfies the one or more threshold criteria, forgoing performing the operation. Additionally or alternatively to one or more of the examples above, in some examples, the one or more first characteristics of the gaze and the one or more second characteristics of the gaze are selected using objective and subjective data.

It will be appreciated that various of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A non-transitory computer-readable storage medium including instructions, wherein the instructions are configured to be executed by one or more processors of an electronic device, and wherein the instructions are for:
   detecting, using one or more sensors, one or more first characteristics associated with a gaze of a person with respect to an object during a period of time;
   detecting, using the one or more sensors, one or more second characteristics that are different from the one or more first characteristics, and that are associated with the gaze of the person with respect to the object at a first time after the period of time;
   determining, using a predictive model, a first score corresponding to a likelihood that the person is aware of the object based on the one or more first characteristics and the one or more second characteristics;
   determining, using the predictive model, a second score corresponding to a likelihood that the person has confidence in their awareness of the object based on the one or more first characteristics and the one or more second characteristics; and
   selectively performing an operation based on the first score or the second score.

2. The non-transitory computer-readable storage medium of claim 1, wherein the one or more first characteristics and the one or more second characteristics include one or more of:
   $d_{current}$, wherein the $d_{current}$ characteristic relates to a distance of the gaze of the person from the object at a particular time;
   $d_{min}$, wherein the $d_{min}$ characteristic relates to a minimum distance of the gaze of the person from the object within an interval of time that includes the particular time;
   $t_{elapse}$, wherein the $t_{elapse}$ characteristic relates to an elapsed time since a fixation of the gaze of the person on the object at the particular time;
   $t_{dwell}$, wherein the $t_{dwell}$ characteristic relates to a total fixation duration of the gaze of the person within the interval of time; or
   Look, wherein the Look characteristic relates to whether the gaze of the person fixated on the object for greater than a threshold amount of time.

3. The non-transitory computer-readable storage medium of claim 1, wherein determining the first score corresponding to the likelihood that the person is aware of the object includes:
   determining an objective indication of awareness of the person of the object using a linear regression model.

4. The non-transitory computer-readable storage medium of claim 1, wherein determining the first score corresponding to the likelihood that the person is aware of the object includes:
   determining a subjective indication of awareness of the person of the object using a linear regression model.

5. The non-transitory computer-readable storage medium of claim 1, wherein the operation includes an autonomous driving operation.

6. The non-transitory computer-readable storage medium of claim 1, wherein selectively performing the operation includes:
   in accordance with a determination that the first score corresponding to the likelihood that that the person is aware of the object does not satisfy one or more threshold criteria, performing the operation; and
   in accordance with a determination that the first score corresponding to the likelihood that the person is aware of the object satisfies the one or more threshold criteria, forgoing performing the operation.

7. The non-transitory computer-readable storage medium of claim 1, wherein the one or more first characteristics of the gaze and the one or more second characteristics of the gaze are selected using objective and subjective data.

8. The non-transitory computer-readable storage medium of claim 1, wherein the one or more first characteristics include time measurements associated with the gaze of the person with respect to the object within the period of time.

9. The non-transitory computer-readable storage medium of claim 1, wherein the one or more first characteristics and the one or more second characteristics include indirect eye glance measures associated with the gaze of the person.

10. The non-transitory computer-readable storage medium of claim 1, wherein the one or more first characteristics and the one or more second characteristics include aggregated eye glance measures associated with the gaze of the person over a time interval.

11. The non-transitory computer-readable storage medium of claim 1, wherein the one or more first characteristics and the one or more second characteristics include features derived from eye glance measures associated with the gaze of the person collected over a time interval.

12. A method comprising:
at an electronic device with one or more processors and memory:
  detecting, using one or more sensors, one or more first characteristics associated with a gaze of a person with respect to an object during a period of time;
  detecting, using the one or more sensors, one or more second characteristics that are different from the one or more first characteristics, and that are associated with the gaze of the person with respect to the object at a first time after the period of time;
  determining, using a predictive model, a first score corresponding to a likelihood that the person is aware of the object based on the one or more first characteristics and the one or more second characteristics;
  determining, using the predictive model, a second score corresponding to a likelihood that the person has confidence in their awareness of the object based on the one or more first characteristics and the one or more second characteristics; and
  selectively performing an operation based on the first score or the second score.

13. The method of claim 12, wherein the one or more first characteristics and the one or more second characteristics include one or more of:
  $d_{current}$, wherein the $d_{current}$ characteristic relates to a distance of the gaze of the person from the object at a particular time;
  $d_{min}$, wherein the $d_{min}$ characteristic relates to a minimum distance of the gaze of the person from the object within an interval of time that includes the particular time;
  $t_{elapse}$, wherein the $t_{elapse}$ characteristic relates to an elapsed time since a fixation of the gaze of the person on the object at the particular time;
  $t_{dwell}$, wherein the $t_{dwell}$ characteristic relates to a total fixation duration of the gaze of the person within the interval of time; or
  Look, wherein the Look characteristic relates to whether the gaze of the person fixated on the object for greater than a threshold amount of time.

14. The method of claim 12, wherein determining the first score corresponding to the likelihood that the person is aware of the object includes:
  determining an objective indication of awareness of the person of the object using a linear regression model.

15. The method of claim 12, wherein determining the first score corresponding to the likelihood that the person is aware of the object includes:
  determining a subjective indication of awareness of the person of the object using a linear regression model.

16. The method of claim 12, wherein the operation includes an autonomous driving operation.

17. The method of claim 12, wherein selectively performing the operation includes:
  in accordance with a determination that the first score corresponding to the likelihood that that the person is aware of the object does not satisfy one or more threshold criteria, performing the operation; and
  in accordance with a determination that the first score corresponding to the likelihood that the person is aware of the object satisfies the one or more threshold criteria, forgoing performing the operation.

18. The method of claim 12, wherein the one or more first characteristics of the gaze and the one or more second characteristics of the gaze are selected using objective and subjective data.

19. An electronic device comprising:
one or more processors; and
memory storing instructions, which when executed by the one or more processors, cause the electronic device to perform a method comprising:
  detecting, using one or more sensors, one or more first characteristics associated with a gaze of a person with respect to an object during a period of time;
  detecting, using the one or more sensors, one or more second characteristics that are different from the one or more first characteristics, and that are associated with the gaze of the person with respect to the object at a first time after the period of time;
  determining, using a predictive model, a first score corresponding to a likelihood that the person is aware of the object based on the one or more first characteristics and the one or more second characteristics;
  determining, using the predictive model, a second score corresponding to a likelihood that the person has confidence in their awareness of the object based on the one or more first characteristics and the one or more second characteristics; and
  selectively performing an operation based on the first score or the second score.

20. The electronic device of claim 19, wherein the one or more first characteristics and the one or more second characteristics include one or more of:
  $d_{current}$, wherein the $d_{current}$ characteristic relates to a distance of the gaze of the person from the object at a particular time;
  $d_{min}$, wherein the $d_{min}$ characteristic relates to a minimum distance of the gaze of the person from the object within an interval of time that includes the particular time;
  $t_{elapse}$, wherein the $t_{elapse}$ characteristic relates to an elapsed time since a fixation of the gaze of the person on the object at the particular time;
  $t_{dwell}$, wherein the $t_{dwell}$ characteristic relates to a total fixation duration of the gaze of the person within the interval of time; or
  Look, wherein the Look characteristic relates to whether the gaze of the person fixated on the object for greater than a threshold amount of time.

21. The electronic device of claim 19, wherein determining the first score corresponding to the likelihood that the person is aware of the object includes:
  determining an objective indication of awareness of the person of the object using a linear regression model.

22. The electronic device of claim 19, wherein determining the first score corresponding to the likelihood that the person is aware of the object includes:
  determining a subjective indication of awareness of the person of the object using a linear regression model.

23. The electronic device of claim 19, wherein the operation includes an autonomous driving operation.

24. The electronic device of claim 19, wherein selectively performing the operation includes:
  in accordance with a determination that the first score corresponding to the likelihood that that the person is aware of the object does not satisfy one or more threshold criteria, performing the operation; and in accordance with a determination that the first score corresponding to the likelihood that the person is aware of the object satisfies the one or more threshold criteria, forgoing performing the operation.

25. The electronic device of claim 19, wherein the one or more first characteristics of the gaze and the one or more second characteristics of the gaze are selected using objective and subjective data.

\* \* \* \* \*

UNITED STATES PATENT AND TRADEMARK OFFICE
CERTIFICATE OF CORRECTION

PATENT NO. : 11,538,259 B2
APPLICATION NO. : 16/950820
DATED : December 27, 2022
INVENTOR(S) : Sujitha Martin et al.

It is certified that error appears in the above-identified patent and that said Letters Patent is hereby corrected as shown below:

In the Claims

In Column 20, Line 47, in Claim 6, delete "that that" and insert --that--.

In Column 21, Line 65, in Claim 17, delete "that that" and insert --that--.

In Column 22, Line 67, in Claim 24, delete "that that" and insert --that--.

Signed and Sealed this
Second Day of May, 2023

Katherine Kelly Vidal
*Director of the United States Patent and Trademark Office*